Inventors:
Eugene P. Wigner
Leo A. Ohlinger
Gale J. Young
Alvin M. Weinberg

Nov. 13, 1956 E. P. WIGNER ET AL 2,770,591
HEAVY WATER MODERATED NEUTRONIC REACTOR
Filed July 3, 1946 9 Sheets-Sheet 3

Witnesses:
Herbert E. Metcalf
Henry H. Johnson

Inventors:
Eugene P. Wigner
Leo A. Ohlinger
Gale J. Young
Alvin M. Weinberg
By Robert A. Lavender
Attorney Nov. 13, 1956  E. P. WIGNER ET AL  2,770,591
HEAVY WATER MODERATED NEUTRONIC REACTOR
Filed July 3, 1946  9 Sheets-Sheet 4

Witnesses:
Herbert E. Metcalf
Henry W. Johnson

Inventors:
Eugene P. Wigner
Leo A. Ohlinger
Gale Young
Alvin M. Weinberg
By Robert A. Lavender
Attorney

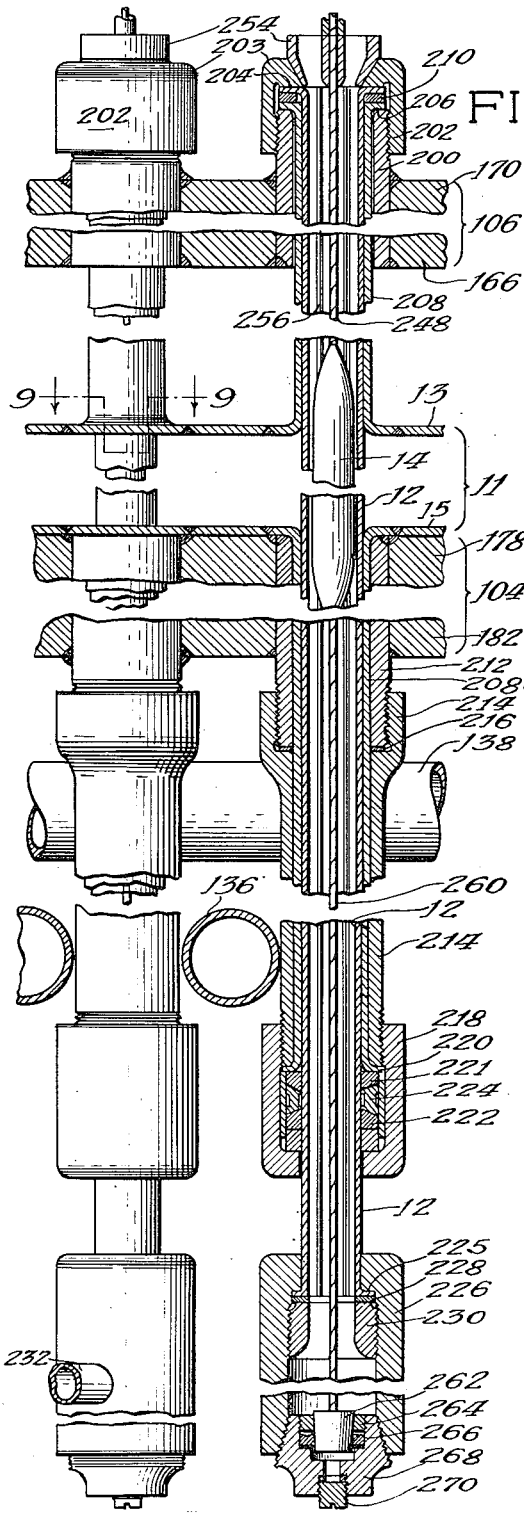
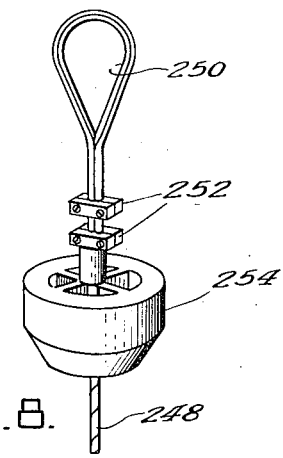
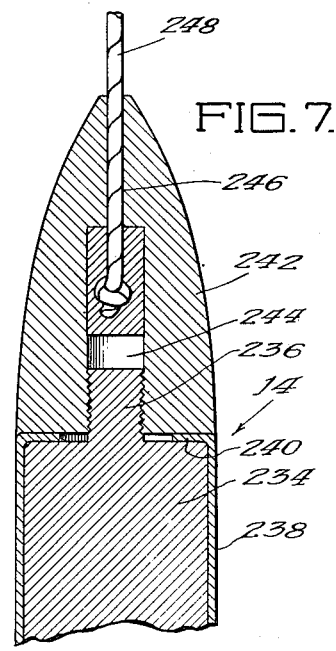

Inventors:
Eugene P. Wigner
Leo A. Ohlinger
Gale J. Young
Alvin M. Weinberg
By
Attorney Nov. 13, 1956 E. P. WIGNER ET AL 2,770,591
HEAVY WATER MODERATED NEUTRONIC REACTOR
Filed July 3, 1946 9 Sheets-Sheet 8
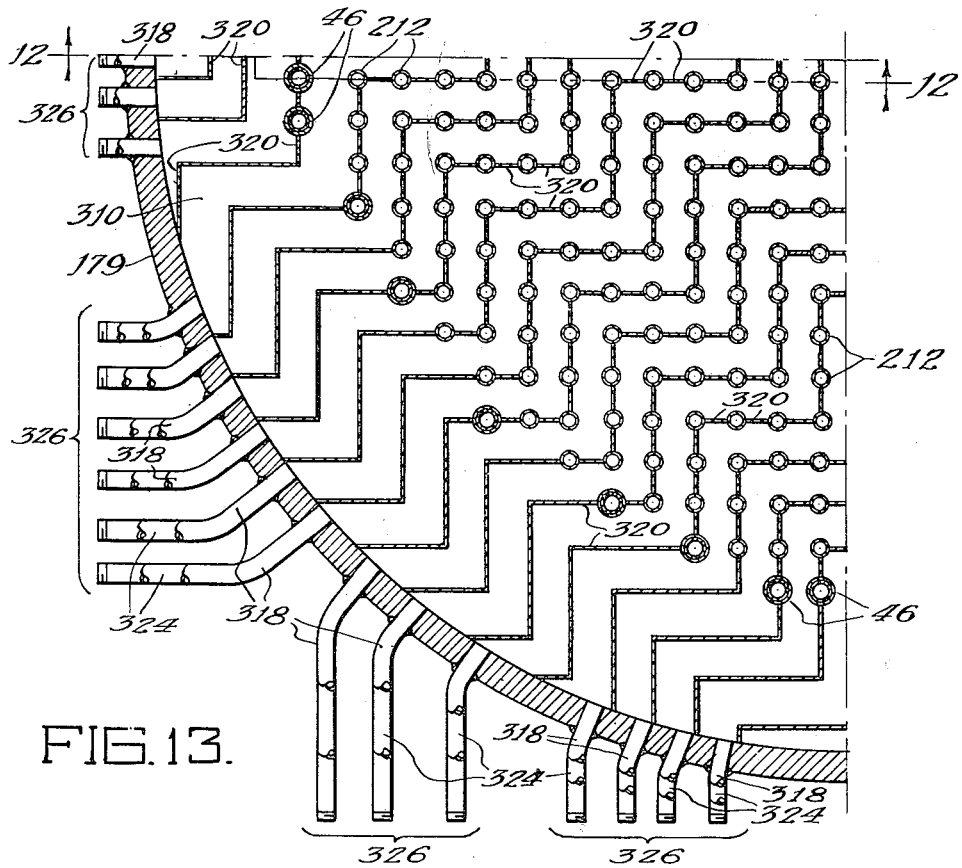
FIG.13.
FIG.14.
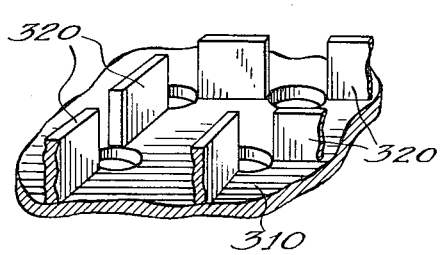
Witnesses:
Herbert E. Metcalf
Henry W. Johnson
Inventors:
Eugene P. Wigner
Leo A. Ohlinger
Gale J. Young
Alvin M. Weinberg
By Robert A. Lavender
Attorney Nov. 13, 1956 E. P. WIGNER ET AL 2,770,591
HEAVY WATER MODERATED NEUTRONIC REACTOR
Filed July 3, 1946 9 Sheets-Sheet 9

Inventors:
Eugene P. Wigner
Leo A. Ohlinger
Gale J. Young
Alvin M. Weinberg
By: Robert A. [Attorney]

United States Patent Office 2,770,591
Patented Nov. 13, 1956

2,770,591

HEAVY WATER MODERATED NEUTRONIC REACTOR

Eugene P. Wigner, Princeton, N. J., Leo A. Ohlinger and Gale J. Young, Chicago, Ill., and Alvin M. Weinberg, Oak Ridge, Tenn., assignors to the United States of America as represented by the United States Atomic Energy Commission Application July 3, 1946, Serial No. 681,252

6 Claims. (Cl. 204—193)

Our invention relates to the general subject of nuclear fission and more particularly to a means and method for creating a self-sustaining neutron chain reaction, also referred to as a neutronic reaction, by nuclear fission of uranium or other material fissionable by slow neutron capture.

It is known that the isotope $U^{235}$ contained in natural uranium in the ratio of approximately 1 to 139 with respect to $U^{238}$ can be split or fissioned by bombardment with thermal neutrons, i. e., neutrons in thermal equilibrium with the surrounding medium, to provide, under certain conditions, a self-sustaining neutronic reaction operating at high neutron densities. The fission neutrons produced by nuclear fission of uranium give rise to new fission neutrons in sufficiently large numbers to overcome the neutron losses in the system. Since the result of the fission of the uranium nucleus is the production of two lighter elements with great kinetic energy, plus approximately an average of 2 neutrons for each fission along with beta and gamma radiation, new elements as well as a large amount of power in the form of heat can be made available in a self-sustaining system.

The new elements are formed in situ in the fissionable material and if these elements are to be utilized effectively it is desirable to separate them from the fissionable material.

Natural uranium or its compounds, particularly by reason of its $U^{238}$ content, has an especially strong absorbing power for neutrons when they have been slowed down to moderate velocities or so-called reasonance energies. The absorption in uranium at these energies is termed the uranium resonance absorption or capture. It is caused by the isotope $U^{238}$ and does not result in fission but leads to the creation of the relatively stable nucleus $94^{239}$, which is an element fissionable by thermal neutrons in a similar manner to the response of $U^{235}$ to thermal neutrons. Such capture is not to be confused with absorption or capture of neutrons by impurities present in the system, referred to later. Neutrons resonance absorption in uranium may take place either on the surface of the uranium, in which case the absorption is known as surface resonance absorption, or it may take place within the mass of the uranium, in which case the absorption is known as volume resonance absorption. Volume resonance absorption is due to the fact that some neutrons make collisions inside the uranium body and may thus arrive at resonance energies therein, and may be directly and immediately absorbed by the $U^{238}$. After successfully reaching thermal velocities, about 40 percent of the thermal neutrons are also subject to capture by the $U^{238}$ content of the natural uranium without fission leading to the production of the new element $94^{239}$.

The resonance capture of neutrons by $U^{238}$ does not result directly in the production of $94^{239}$ but rather in the production of $93^{239}$ which, by loss of beta particles transforms to $94^{239}$ the change being effected with a half-life of 2.3 days.

Most of the neutrons arising from the fission process are set free with the very high energy of above one million electron volts average and are therefore not in condition to be utilized efficiently to create new thermal neutron fissions in $U^{235}$. The fast neutrons from fission, after they are created, must be slowed down to thermal energies by collision with the atoms of a neutron moderator before they are most effective to produce fresh fission by bombardment of additional $U^{235}$ atoms. It is necessary that the neutrons be slowed down without much absorption until they reach thermal energies and then mostly enter into the uranium rather than into any other element to provide a self-sustaining nuclear chain reaction. Deuterium in the form of heavy water may be used as a moderator. In systems utilizing the fissionable material such as uranium metal in aggregated form, such as in rods or tubes, it is necessary to recover the elements formed by the fission process from the parent neutron irradiated uranium.

It is a principal object of our invention to provide a neutronic chain reacting system incorporating uranium wherein the newly formed elements resulting from fission and the newly formed elements resulting from the capture of neutrons by $U^{238}$ not resulting in fission may be easily recovered for use externally of the system.

The moderator, if a liquid such as heavy water, is enclosed in a tank, the uranium being suspended therein in the form of rods, tubes or other structural shapes. This assembly including the tank, moderator, and uranium is referred to as the reactor of the system and the ability of any reactor to develop a self-sustaining neutronic reaction by the release of neutrons from the uranium depends upon the number of new fast neutrons released by fission with respect to the original fast neutrons in the system per generation. Thus the ratio of the number of fast neutrons produced by the fissions to the original number of fast neutrons per generation in a system of infinite size using specific materials and arrangement of materials, is called the reproduction or multiplication factor of the reactor and is denoted by the symbol K. By making K sufficiently greater than unity to create a net gain in neutrons per generation, and by making the reactor sufficiently large that this gain is not entirely lost by leakage from the exterior surface of the reactor, a self-sustaining neutronic reacting system can be built to produce new elements and fission products, as well as energy in the form of heat, by nuclear fission of natural uranium by thermal neutrons. The neutron reproduction ratio denoted by the symbol $r$ (sometimes known as "effective" K) in a system of finite size differs from the factor K by the external leakage factor, and must be sufficiently greater than unity to permit the neutron density to rise exponentially in the system. Such rise will continue indefinitely if not controlled at a desired neutron density corresponding to a desired power output.

During the interchange of neutrons from their point of origin to their point of utilization in fission, neutrons may be lost not only by $U^{238}$ capture leading to the production of $94^{239}$, as indicated above, but by absorption in the moderator, by absorption in impurities in the reactor, and by leakage from the reactor.

A moderator such as the deuterium constituent of heavy water has very low neutron capture characteristics and its ability to slow the neutrons from their emission velocity to resonance and thermal energies, is very great. While such a moderator, referred to hereinafter as heavy water, has lower neutron capture characteristics than a moderator such as carbon, in the form of graphite, or beryllium, it lacks the structural strength of these latter materials so that in reactors incorporating heavy water as the sole or principal moderator constituent, it is difficult to support the relatively dense and heavy uranium especially when in rod or tube form.

It is thus a further object of the invention to provide a reactor wherein the fissionable material may be supported in neutron transfer relation with a heavy water moderator, and from which the neutron irradiated fissionable material may be removed without difficulty for recovery of the fission products and newly created elements therefrom.

In addition to the above-mentioned losses that are inherently a part of the neutronic process, impurities present in both the moderator and the uranium add a very important neutron loss factor. The effectiveness of various elements as neutron absorbers varies tremendously. Certain elements such as boron, cadmium, samarium, gadolinium, and some others, if present even in a few parts per million, could prevent a self-sustaining chain reaction from taking place. It is important, therefore, to remove as far as possible all impurities capturing neutrons to the detriment of the chain reaction from both the slowing material and the uranium. If these impurities are present in too great quantity, the self-sustaining chain reaction cannot be attained. The permissible amounts of impurities will vary, depending upon such considerations as the form in which the uranium is used—that is, whether natural or enriched with other fissionable materials such as $94^{239}$, whether as metal or oxide. The weight ratio between the uranium and the moderator also influences the effect of impurities. Elements such as oxygen and carbon may be present in large quantities, so the uranium may be in the form of an oxide, such as $UO_2$ or $U_3O_8$, or as a carbide.

Helium has an exceedingly low neutron capture cross section and consequently introduces little effect as an impurity in a chain reacting system. Thus helium may be present in fairly large amounts and, as hereinafter disclosed, may be used to dilute and remove certain gaseous products developed in the operation of our chain reacting system. Nitrogen, however, has a considerably larger capture cross section and the effects of nitrogen may be eliminated by excluding nitrogen from the system.

The effect of impurities on the optimum reproduction factor K may be conveniently evaluated by means of certain constants known as "danger coefficients" which are assigned to the various elements. These danger coefficients for the impurities are each multiplied by the ratio of the total weight of the corresponding impurity compared to the total weight of uranium therein, and the total sum of these products gives a value known as the total danger sum. This total danger sum is subtracted from the reproduction factor K as calculated for pure materials and for the specific geometry under consideration. The term "geometry" is here used to denote the physical form of the uranium and the distribution thereof in the moderator.

The danger coefficients are defined in terms of the weight of impurity per unit mass of uranium and are based on the capture cross section for absorption of neutrons of the various elements. These values may be obtained from publications on the subject and the danger coefficient computed by the formula $$\frac{\sigma_i}{\sigma_u} \cdot \frac{A_u}{A_i}$$

wherein $\sigma_i$ represents the absorption cross section for the impurity and $\sigma_u$ the absorption cross section for the uranium, $A_i$ the atomic weight of the impurity and $A_u$ the atomic weight for uranium. If the impurities are in the slowing medium they are computed as their fraction of the weight of the uranium in the system. Danger coefficients are well known in the art, as shown for example by the table appearing in the application of Enrico Fermi and Leo Szilard, Serial No. 568,904, filed December 19, 1944, now Patent 2,708,656, dated May 17, 1955.

As a specific example, if the materials of the system under consideration have 00.01 percent by weight of Co and Ag, and the danger coefficients of Co and Ag are 17 and 18, respectively, the total danger sum in K units or such an analysis would be:

$$.0001 \times 17 + .0001 \times 18 = .0035K$$

This would be a rather unimportant reduction in the reproduction factor K unless the reproduction factor for a given system, without considering impurities is very nearly unity. On the other hand, if the impurities in the uranium are 00.01 percent by weight of Li, Co and Rh, the total danger sum in K units would be:

$$.0310 + .0017 + .0050 = .0377K$$

This latter reduction in the reproduction factor for a given system would be very serious and might well reduce the reproduction factor below unity so as to make it impossible to effect a self-sustaining chain reaction with natural uranium and a solid moderator such as graphite, but might still be permissible when using heavy water as a moderator, or enriched uranium in systems having a high K factor.

While it would be desirable to utilize structural members within a heavy water moderated reactor to support the uranium it will be apparent from the above consideration with respect to impurities and their neutron absorbing characteristics that it is very desirable to reduce such members that act as impurities to a minimum. Consequently, it is likewise desirable to avoid use of structural supports within the reactor as far as possible since neutron absorption thereby may be overcome only by increasing the overall size of the reactor, necessitating the use of additional support members.

It is thus another object of the invention to provide a neutronic reactor wherein the uranium may be supported in neutron transfer relationship with heavy water with a minimum of structural members exposed to the neutronic reaction.

When the uranium and the moderator are of such purity, and the uranium is so proportioned with respect to the moderator that fewer neutrons are parasitically absorbed than are gained by fission, the uranium will support a neutronic reaction resulting in an exponential rise in neutron density if the overall size of the reactor is sufficiently large to overcome the loss of neutrons escaping from the reactor. Thus the overall size is important.

The overall size of the system will vary, depending upon the reproduction factor K of the system. If the factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, that may overbalance the rate of neutron production inside the structure so that a chain reaction will not be self-sustaining. For each value for the reproduction factor K greater than unity, there is thus a minimum overall size of the structure known as critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K is known. The ratio of the exterior surface to the volume becomes less as the structure is enlarged.

In the case of a spherical structure employing uranium bodies of any shape or size imbedded in a heavy water moderator, the following formula gives the critical overall radius:

critical sphere R cm., $R = \dfrac{56.5}{\sqrt{K-1}}$

For a parallelepiped structure rather than spherical, the critical size can be computed from the formula $$K - 1 = 323\pi^2 \left( \frac{1}{a^2} + \frac{1}{b^2} + \frac{1}{c^2} \right)$$

where $a$, $b$ and $c$ are the lengths of the sides in centimeters. The critical size for a cylindrical structure is given, irrespective of the shape of the uranium bodies, by the formula $$K - 1 = \frac{323\pi^2}{h^2} + \frac{777}{r^2}$$

where $h$ is the height of the cylinder in centimeters and $r$ is the radius.

It is a further object of the invention to provide a neutronic reactor of practical critical size when using aggregated uranium distributed as a lattice in a heavy water moderator with a minimum of structural support for the uranium and wherein the uranium may be removed without difficulty for recovery of fission products and newly created elements.

The fission reaction is accompanied by the emission of heat mainly from the beta radiation and from the absorption of kinetic energy developed upon formation of the two lighter elements by fission of the uranium. Consequently, unless adequate cooling is provided whereby the heat developed in the uranium during the fission process is removed high neutron densities in the reactor cannot be maintained for long periods of operation. In addition, the products of the fission reaction are extremely radioactive and when uranium has been subjected to high neutron densities over relatively long periods of time the heat developed by radioactive decay, such as by the emission of beta particles, causes rapid increase of temperature of the uranium even after reduction of the neutron density within the reactor to low values or to substantially zero, if adequate cooling is not continued for some time thereafter.

It is therefore a further object of the invention to provide a reactor of the type described that may be operated at high neutron density and may be adequately cooled to attain thermal equilibrium both during the continuance of the neutronic reaction and following the reduction of the neutron density to low values.

Recovery of the newly created radioactive products from the uranium may be delayed until the normal radioactive decay of the fission products has rendered the uranium safe to handle, although such delay necessitates shut-down of the reactor for considerable periods, such as one hundred days or more, depending upon the maximum neutron density attained and the length of time of reactor operation at such density. It is therefore desirable to provide means whereby the recovery of the products may be effected without material delay with complete safety to operating personnel during the removal.

Consequently, it is a further object of the invention to provide a neutronic reactor system wherein the uranium may be removed from the reactor for recovery of the radioactive fission products and newly created elements such as $93^{239}$ and $94^{239}$ with a minimum of delay and without danger to operating personnel.

Since the neutronic reaction is accompanied by the copious emission of neutrons, beta particles and gamma rays, it is accordingly desirable to provide shielding means whereby such radiation is reduced or rendered harmless to operating personnel during the normal operation of the system and after shut-down thereof. Thus, while shut-down terminates the normal generation of neutrons and substantially all neutron generation ceases after approximately one-half hour following shut-down of the system, beta and gamma radiation continues from the radioactive decay of the products resulting from fission. While the beta radiation may be absorbed readily, it is desirable to provide shielding means for protection against gamma rays, even after shut-down.

In a fluid cooled neutronic system, particularly if the fluid comes into contact with the uranium, the fluid may receive some of the fission products and thereby become radioactive. Consequently, it is desirable to reduce the biological hazard from exposure to the cooling fluid to prevent personnel injury by radioactivities either induced therein or carried thereby.

It is thus a still further object of the invention to provide adequate shielding of a neutronic reaction system and particularly in a system wherein a cooling fluid may entrain fission products during operation of the system.

In accordance with the invention, we provide a heavy water moderated neutronic reactor wherein the fissionable material, such as uranium in the form of elongated bodies, is supported vertically in a container of heavy water moderator so that the weight of the uranium is supported from without the container, thereby minimizing support members within the container. Still further, we provide means to immerse the reactor in a shielding fluid and to cool the uranium by vertical fluid flow discharging into the fluid shield. We further provide means for removing the elongated uranium bodies from the reactor into the fluid shield and we transfer the bodies to a shielded container without removal from the fluid shield, the fluid shield protecting operating personnel during the removal and transfer operations. We also provide a fluid having high neutron slowing and absorption characteristics, such as water, in combination with a second hydrogenous immiscible fluid floating thereon to provide adequate shielding from radiation developed within the reactor and radiation that may emanate from the cooling fluid.

These and other objects, features and advantages of the invention will become apparent when considered in view of the following description and the accompanying drawings, wherein:

Fig. 6 is an enlarged, cut away view of portions of two tubes extending through the reactor shown in Fig. 2, one of the tubes being shown in elevation and the other in section;

Fig. 7 is an enlarged, fragmentary, longitudinal sectional view of a uranium rod and cap member;

Fig. 8 is an enlarged perspective view of a uranium rod supporting member used in connection with the tubes shown in Fig. 6;

Fig. 13 is a sectional view, partially in plan, taken through the portion of the neutron and gamma ray shield shown in Fig. 12, the view being taken on the line 13—13 of Fig. 12;

Fig. 14 is a fragmentary perspective view of a portion of the structure shown in Fig. 13;

Fig. 16 is a vertical sectional view of the coffin shown in Fig. 2, the view being shown partly in elevation.

Figure 1:
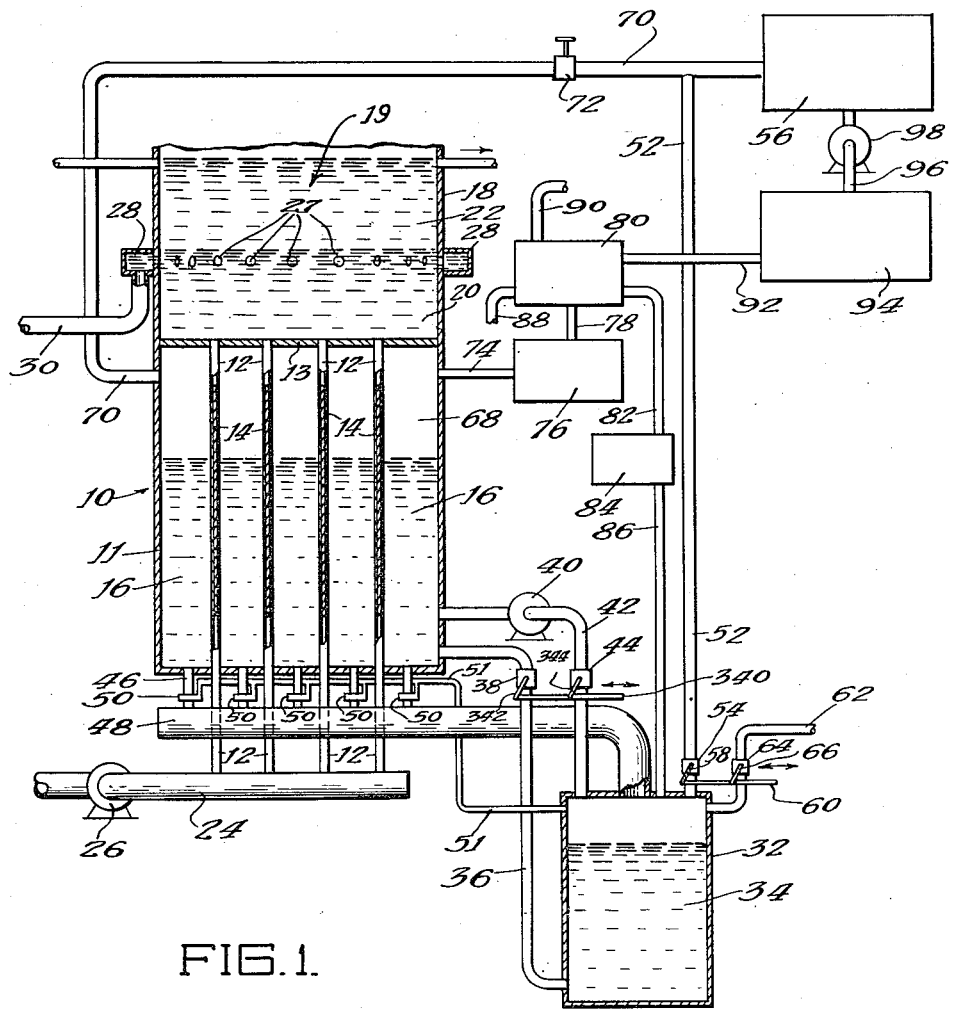
Fig. 1 is a flow diagram of a neutronic reaction system incorporating various features of the present invention.

As a detailed specific example of a suitably cooled uranium-heavy water moderated neutronic system, the embodiment diagrammatically shown in Fig. 1 is selected as a preferred example.

In the present embodiment, light water is selected as the coolant and it is circulated through the reactor in aluminum tubes. Beryllium is also suitable as tube material, and may be more desirable than aluminum in at least two respects; i. e., it has a lower absorption for thermal neutrons, and in itself is effective as a neutron moderator.

As an example of an operative system, an output of about 50,000 kilowatts, the electrical equivalent of the heat energy removed from the reactor at thermal equilibrium, can be realized in a system employing about ten tons of heavy water and six tons of uranium metal in the form of rods. This presupposes that a peripheral neutron reflector is used for conserving neutrons otherwise escaping from the periphery of the reactor, and for illustrative purposes a graphite reflector has been selected. A small reduction in overall size for the active part of the reactor can be effected by using a reflector. About 80 tons of graphite are required and such a system is illustrated in the drawings and the description to follow. Cooling water is circulated through the system at the rate of about 13,000 gallons per minute.

It is recognized, of course, that other arrangements can be employed than those shown and the uranium may be in one of a variety of forms. For example, the uranium may vary in size and shape from small particles to larger lumps or bodies in any convenient size and shape, such as spheres, tubes or rods, although for purposes of description we will refer to the uranium as being in the form of rods.

Since heavy water has a low absorption characteristic for thermal neutrons, the actual spacing of the uranium rods in this moderator is not as critical as in the case where a moderator such as graphite is used. In graphite, for example, because of the probability of its absorbing thermal neutrons, it is important that the uranium bodies be so arranged that neutrons have a high probability of entering a uranium body promptly after being slowed to thermal energy. With heavy water, however, thermal neutrons may diffuse larger distances in the moderator without being absorbed by the heavy water. Thus, generally speaking, there is a greater range of body spacings that can be tolerated in a heavy water system than in one wherein graphite is employed as the moderator.

Referring first to Fig. 1, that shows a simplified flow diagram of a neutronic reaction system incorporating the invention, the neutronic reaction is caused to occur in a reactor 10. The reactor 10 comprises a container or reaction tank 11 which is vertically pierced with a relatively large number of conduits or tubes 12, only four of which are shown diagrammatically, enclosing natural uranium rods 14 surrounded by heavy water 16 that serves as a moderator. In the simplified diagram we provide a shield tank 18, above the reactor 10, containing a clear fluid generally designated 19, such as water 20 immediately above the reactor, and a clear low volatility liquid such as a hydrocarbon 22 floating on the water 20. The tubes 12 open through the reaction tank top 13 into the shield tank 18 and are supplied through the lower ends thereof from a cooling water supply header 24 into which cooling water may be forced by a pump 26 from a source of cooling water not shown. The cooling water introduced through the header 24 flows upwardly through the tubes 12, around the uranium rods 14, and into the shield tank 18 from which it is withdrawn through orifices 27 leading to a discharge header 28 surrounding the shield tank 18 and from which the discharge water may be withdrawn through a pipe line 30. The reaction tank 11 is only partially filled with the heavy water moderator 16 for purposes of controlling the neutronic reaction reproduction ratio, as later described in greater detail, from a heavy water reservoir 32, the level of heavy water 34 in the reservoir being determined by the maximum requirements for heavy water in the reaction tank 11. More particularly, the heavy water reservoir may be maintained under pressure and the heavy water may be introduced to the reaction tank through a pipe line 36 under control of a valve 38. Excessive heavy water may be pumped from the reaction tank 11 to the reservoir 32 by a pump 40 operating through a pipe line 42 and valve 44.

The effective size of the reactor 10 is determined by the quantity of heavy water in the reaction tank 11 and since an excessive quantity of heavy water in the reaction tank 11, over and above critical size conditions, may result in a rapid exponential rise in neutron density, we provide means for dumping the heavy water rapidly from the tank 11 through a number of emergency pipe lines 46, connected between the periphery of the bottom portion of the reaction tank 11 and a heavy water outlet header 48 leading to the heavy water reservoir 32. Each of the emergency pipe lines 46 is provided with a safety control valve 50 (best shown in Fig. 5) maintained in a closed position by gas pressure applied through pipe lines 51 from the heavy water reservoir 32. Such pressure is preferably maintained by helium gas introduced to the heavy water reservoir through a pipe line 52 and valve 54 from a helium reservoir 56. During reactor operation the valve 54 is maintained in an open position by a valve lever 58 connected to a control rod 60, and in the event that rapid dumping of the heavy water in the reaction tank 11 is desired, the helium pressure in the reservoir 32 may be reduced rapidly by opening the reservoir to the atmosphere through a line 62 by opening valve 64. Release of pressure in the reservoir 32 likewise releases pressure in the pipe lines 51 connected to the dump valves 50 causing them to open and the heavy water moderator 16 to be dumped rapidly into the reservoir 32. Thus when one valve, such as the valve 64 is in a closed position the other, such as valve 54, is in an open position.

During operation, the reaction tank 11 is maintained only partially filled with the heavy water 16 leaving a space 68 above the heavy water for release of gases therefrom produced during operation of the reactor. For example, during operation of a neutronic reaction system utilizing a heavy water moderator, decomposition products, such as deuterium and oxygen, are formed from the heavy water. Such decomposition products are collected in the space 68 above the heavy water moderator and are diluted and swept from the reaction tank by a flow of helium introduced through a line 70 from the helium reservoir 56 as controlled by valve 72. The flow of helium over the heavy water entrains the gaseous decomposition products that are vented through an exhaust pipe line 74. Since the decomposition products are predominantly deuterium and oxygen these gases may be recombined in a recombination chamber 76 connected thereto by the exhaust pipe line 74. The recombination chamber 76 may enclose a catalytic agent such as platinized charcoal maintained at an elevated temperature or a hot grid over which the gases are driven by the helium to be recombined into heavy water vapor. Such vapor is withdrawn from the chamber 76 through a pipe line 78 and led to a heavy water condenser 80 for condensation of the vapor, whereupon the condensed heavy water is returned to the reservoir 32 through a line 82, heavy water purifier 84, and line 86. The condenser 80 is cooled by a fluid medium such as water introduced thereto through the inlet line 88, and withdrawn through an outlet 90. The helium is withdrawn from the condenser through a line 92 leading to a helium purifier 94 where other gaseous products that may be formed in the reactor are removed, whereupon the helium is returned through a pipe line 96 and pump 98 to the helium reservoir 56.

In the operation of the system shown and so far described in Fig. 1, the neutronic reaction within the reactor 10 develops considerable energy in the form of beta and gamma rays as well as kinetic energy from the fission products. A great portion of this energy is released within the tubes 12 extending vertically through the reaction tank 11 and is absorbed by the flow of water through these tubes around the uranium rods 14. However, some of the neutrons developed in the reactor, as well as high intensity gamma rays, escape therefrom and may result in a great health hazard to operating personnel. With our arrangement of the water and hydrocarbon fluid in the shield tank 18 considerable protection is offered for operating personnel above the neutronic reactor, although we prefer to provide additional shielding completely surrounding any source of neutrons and gamma rays. Consequently, we place the reactor between heavy shields, not shown in Fig. 1 but referred to below, so that operating personnel may approach the equipment for servicing purposes.

Also in operation of the neutronic reactor system so far described, it is desirable to periodically remove the uranium from the reactor for the purpose of recovering the newly created elements and fission products developed during the fission process. Inasmuch as many of the fission products are radioactive, rendering these products valuable for use in radioactive work such as for biological tracers, and as the newly created element $94^{239}$ is valuable as a fissionable material with which the active material of neutronic reactors may be enriched, it is most desirable to provide means whereby the uranium may be removed from the reactor without excessive delay so that these products may be recovered from the uranium.

However, since the fission products are radioactive, it would be very dangerous for operating personnel to become exposed to the uranium during the removal thereof from the reactor. In addition, the radioactive decay of the fission products produces rapid self-heating and increase in temperature of the uranium during removal thereof, unless precautions are taken to continue the uranium cooling during and after removal. In accordance with a further teaching of the invention, we provide means whereby the uranium may be removed from the reactor without delay and without danger from exposure or overheating of the uranium, thus allowing the reactor to be reloaded and again placed in operation while the excessive radioactivity of the removed uranium is decaying.

Figure 2:
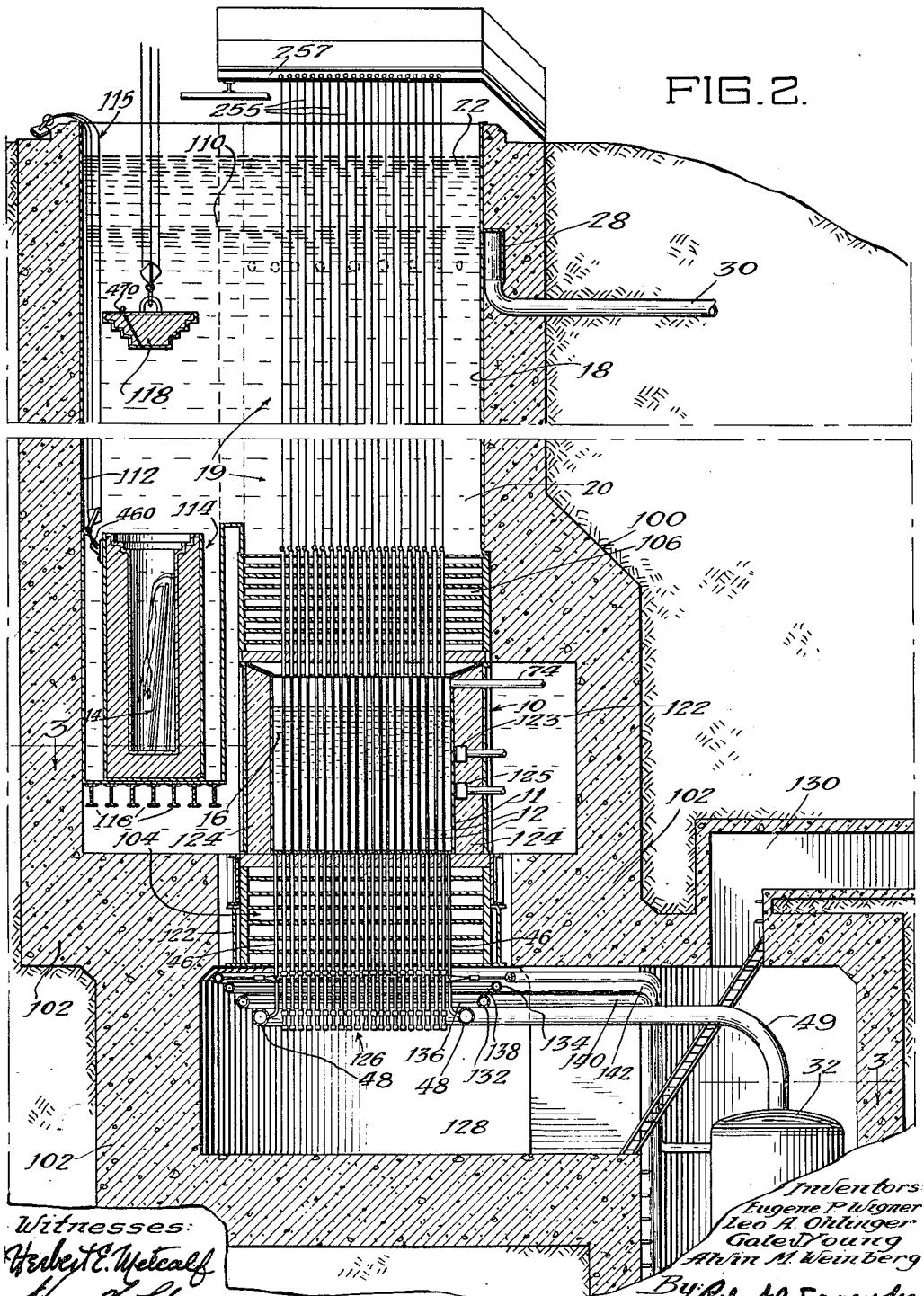
Fig. 2 is a more or less diagrammatic view, partly in section and partly in elevation, of a neutronic reactor and associated shields and apparatus.
Figure 3:
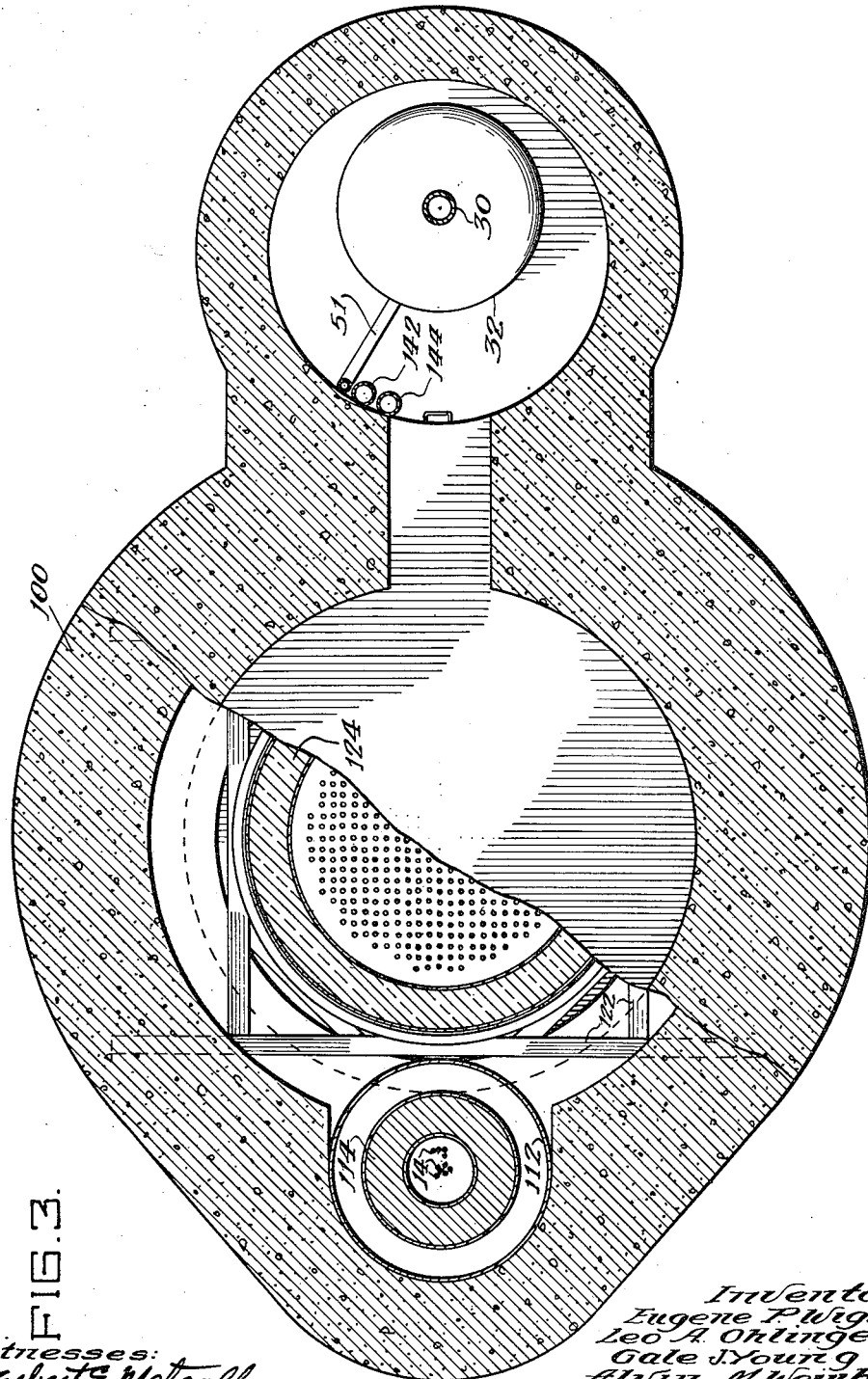
Fig. 3 is a horizontal sectional view, partially in plan, of the apparatus shown in Fig. 2 taken along the line 3—3 thereof.

Referring generally to Figs. 2 and 3, we have shown a neutronic reactor and associated equipment, particularly adapted for the creation of new elements at high rates and from which the uranium or other fissionable material may be removed without danger of exposure to operating personnel or overheating of the uranium during its removal. The structure shown in Figs. 2 and 3 is particularly adapted for construction underground, the cost of the shielding being reduced by such placement of the apparatus. Preferably, the structure is located near the top of a hill so that access may be had to the lower portions thereof through the hillside. More particularly, and referring to Figs. 2 and 3, wherein structure previously referred to is similarly referenced, the reactor 10 is enclosed by concrete side walls 100 supported on a concrete base 102 with the top of the reactor 10 positioned approximately 35 feet below the ground level. In general, the reactor 10 is supported by a neutron and gamma ray shield generally designated 104 supported by the concrete base 102. The reactor 10 is surmounted by a similar neutron and gamma ray shield 106 hereinafter referred to as the upper shield. The entire apparatus, including the two shields 104 and 106 with the reactor 10 therebetween, is covered by approximately 30 feet of clear liquid 19 retained within a tank 18 wholly enclosed by the concrete walls 100. The tank 18 extends from the upper surface of the upper shield 106 to ground level and is filled with a clear liquid 19. More particularly, the lower portion of the tank 18 is filled with water 20 and an immiscible low volatility hydrocarbon 22 floats on the water 20. The relative depth of the water 20 and hydrocarbon 22 may be varied over wide limits although we have shown a greater depth of water than of the hydrocarbon with the interface at broken line 110. The tank 18 is provided with an offset chamber 112, located to one side of the reactor 10 and upper shield 106, constructed to receive an open ended container or coffin 114 into which uranium rods are placed following their removal from the reactor as appears more fully hereinafter. The container or coffin 114 is constructed of lead or other dense metal and is supported on I-beams 116.

The reactor 10 is enclosed laterally by a neutron reflector 124 of relatively pure graphite, beryllium oxide, heavy water or other material having high neutron scattering capabilities and low neutron capture characteristics. We prefer and have shown the use of graphite as a reflector material because of its low cost. Neutrons escaping from the reactor 10 are slowed by collision with the graphite atoms and deflected, the statistical probability of their being returned to the reactor being increased by the use of such a scattering material surrounding the reactor.

We have shown two ionization chambers generally designated 123 and 125 adjacent the reactor 10 between the reactor and the reflector 124. The ionization chambers are responsive to the density of neutrons developed within the reactor and are used for controlling the neutronic reaction as later described in connection with Fig. 15.

The weight of the liquid 19, upper shield 106 and reactor 10 is supported by I-beams 122 that likewise support the neutron reflector 124 surrounding the lateral surface of the reactor 10 preferably external to the reaction tank 11. As appears more particularly hereinafter the tubes 12 extend through the reaction tank 11 and lower shield 104 and terminate in a cooling water distribution system generally designated 126 located beneath the shield 104 in a space 128 in the base 102 to which access may be had through an areaway 130 communicating to the ground level. The distribution system 126 comprises distribution headers 132 and 134 that connect to lateral distribution channels generally designated 136 and 138, respectively, that connect in turn to the lower ends of the tubes 12.

As later described in connection with Figs. 10 and 11 the distribution channels lie below the shield 104 and between the tubes 12 in such manner that two channels 136 are disposed vertically between each row of tubes in one direction, while two similar channels 138 are disposed vertically between each row of tubes running in a perpendicular direction to the channels 136.

The headers 132 and 134 are preferably of circular shape extending around the lower portion of the tubes 12 terminating in water supply mains 140 and 142. Emergency pipe lines 46, having valves 50 therein, extend through the shield 104 from the reactor tank 11 to the discharge header 48 connected by a pipe 49 to the heavy water reservoir 32 so that heavy water may be dumped by release of pressure in the heavy water reservoir as previously described in connection with Fig. 1.

The water introduced into the system from the water supply mains 140—142 is distributed by the distribution system 126 to the various tubes 12, through which the water flows in an upward direction around the uranium rods previously referred to and is discharged into the tank 18 to form the water 20 portion of the fluid shield generally designated 19. This water is heated in passage through tubes 12 during the maintenance of the neutronic reaction within the reactor 10 and, hence, is in a heated condition in the shield tank 18. The interface 110 between the shield water 20 and the immiscible hydrocarbon 22 is maintained substantially constant by overflow of the water through orifices 27 in the tank 18, whereupon the overflow water is discharged into an overflow annulus 28 into a water discharge pipe line 30. This water may be cooled and recirculated by redistribution through the distribution system 126 although we prefer to discard this water inasmuch as under certain adverse operating conditions this water may become slightly radioactive as appears more fully hereinafter.

Figure 4:
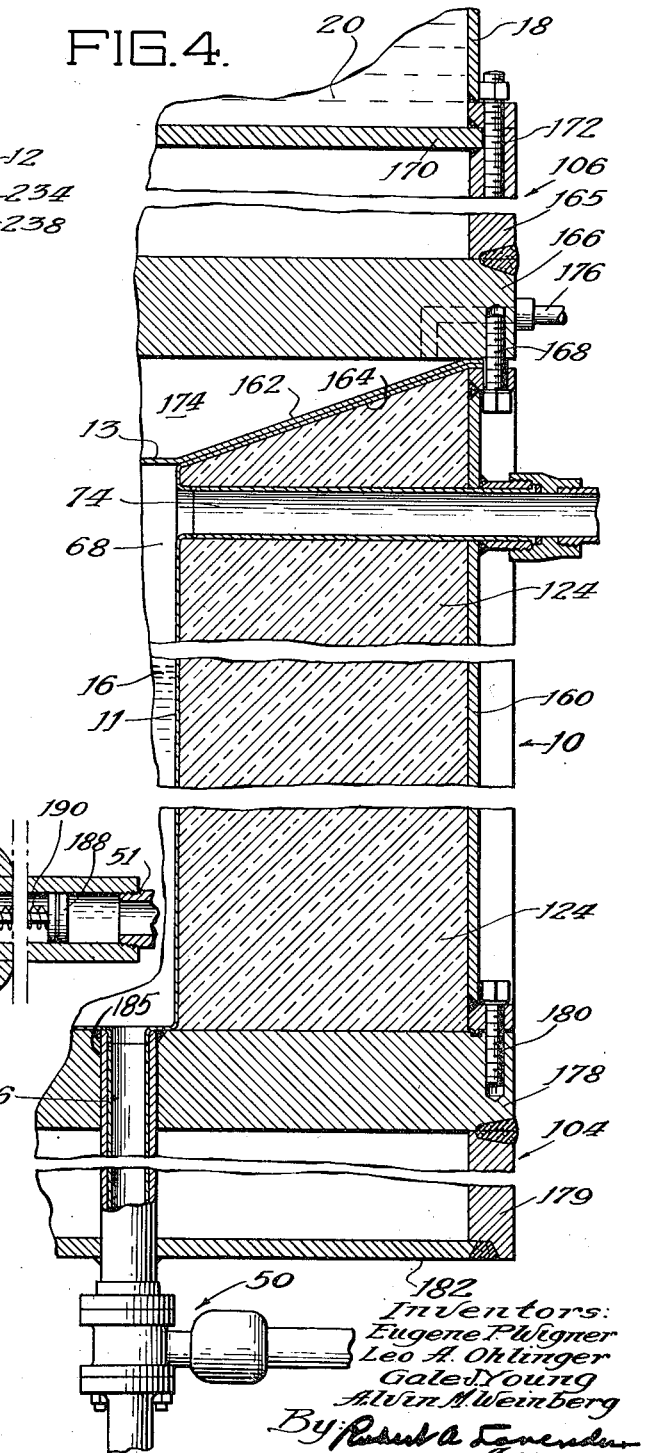
Fig. 4 is an enlarged sectional view, partially in elevation, of a portion of the structure shown in Fig. 2.

The positioning of the reactor 10 with respect to the neutron and gamma ray shields 104 and 106 and the neutron reflector 120 is best shown in Fig. 4. The reaction tank 11 is of 3/16 inch thick aluminum and of cylindrical form surrounded laterally by the graphite reflector 124 contained within a cylindrical outer shell 160. The heavy water 16 partially fills the tank 11 leaving the space 68 thereover in which decomposition products of the heavy water may collect, being withdrawn through a pipe line 74 as previously indicated in connection with Fig. 1. A top 13 of the reaction tank 11 is flared upwardly as shown at 162 about its periphery and rests on a correspondingly flared upper edge 164 of the tank 11 that extends over the shell 160, being fastened thereto such as by welding (not shown). The edge 164 is flared for the purpose of allowing expansion without danger of leakage of heavy water vapor from the tank 11.

The lowermost portion of the upper shield 106 is a base plate 166 secured to the shell 160 surrounding the reflector 124 by threaded studs 168 spaced around the periphery of the shield, only one such stud being shown in Fig. 4. The shield 106 is shown in Fig. 4 as being broken away except for the portion of a shell 165 forming the cylindrical boundary of the shield, a base plate 166 and an upper plate 170 to which the lower edge of the tank 18 is fastened, such as by studs 172 spaced peripherally about the base of the tank 18. The space 174 between the reaction tank top 13 and the base plate 166 of shield 106 is filled with helium introduced through a pipe line 176 to aid the transfer of heat thereacross.

The shield 104 is likewise shown broken away in Fig. 4, a heavy top member 178 thereof supporting the bottom of the reaction tank 11 through a shield shell 179 and being fastened to the reflector shell 160 by studs 180 arranged peripherally thereof. Except for the top member 178 only the lower plate 182 and the shell 179 of the shield 104 are shown in Fig. 4, the plate 182 being the lowermost portion of the structure shown in Fig. 2 above the cooling water distribution system 126 previously referred to.

Figure 5:
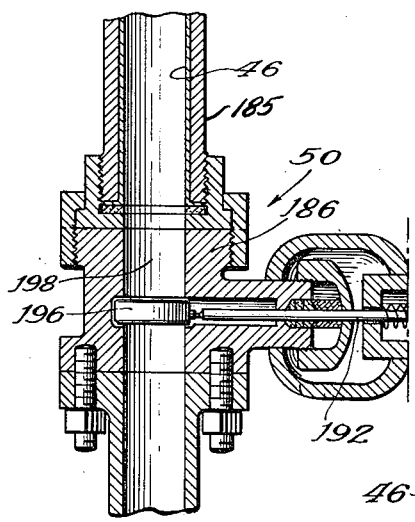
Fig. 5 is a sectional view of the valve mechanism shown in Fig. 4.

The emergency heavy water discharge pipes 46 extend through the lower shield 104 and terminate in the pressure operated emergency dump valves 50 only one such representative assembly being shown in Figs. 4 and 5. For example, each of the pipes 46 is welded to the top member 178 and has an aluminum lining 185, the opposite end thereof being threadedly seated in casing 186 of valve 50. The valve 50 is maintained closed by helium pressure introduced through the pipe line 51 connected to the heavy water reservoir 32 as previously described. Such pressure forces piston 188 against the spring tension of spring 190 pushing valve plunger 192 and valve gate 196 into such position that the channel 198 in the valve casing 186 is closed. Upon release of helium pressure in the line 51 the spring 190 forces the piston 188 in the opposite direction, opening the channel 196 allowing the heavy water 16 in the reaction tank to be forced into the heavy water reservoir 32.

After prolonged operation it may be desirable to replace or repair the tubes 12 that pass through the reaction tank 11 so that it is desirable to provide a construction whereby replacement or removal and repair is facilitated. The tubes 12 are preferably of aluminum or other metal having low neutron capture characteristics to minimize loss of neutrons within the reactor. While aluminum tubes are mentioned, it should be appreciated that other materials, such as beryllium, may be used. The neutron loss in the reactor 10 will vary depending upon the material used for the tubes 12, and in the following description it is assumed that aluminum is used, the representative dimensions hereinafter referred to being representative of such construction. There is shown a preferred tube construction made in accordance with the present invention in Fig. 6, illustrating two adjacent tube assemblies with one assembly sectionalized to show the internal structure thereof.

Referring to Fig. 6 wherein various parts of the apparatus previously described are cut away for the sake of clarity, the upper plate 170 of the shield 106 is apertured and provided with a threaded nipple 200 welded thereto and extending through the shield 106 terminating in the base plate 166 of the shield. A threaded cap member 202 having a flange 203 is screwed down into engagement with a top flange 204 on the upper end of the aluminum tube 12. The cap member 202 likewise compresses a flange 206 on an outer tube 208 likewise preferably of aluminum with an intermediate neoprene gasket 210 therebetween to provide a good vapor tight joint between the nipple 200 and the cap member 202. The end of the outer tube 208 opposite the flange 206 is welded to the top 13 of the tank 11.

The bottom shield 104 is likewise pierced with a threaded nipple 212, extending between the shield top member 178 and lower plate 182 thereof. A bell-shaped jacket 214 threadedly engages the threaded lower end of the nipple 212, the joint being sealed through a gasket 216. The jacket 214 and nipple 212 enclose an outer tube 208a welded to bottom 15 of the reaction tank 11 and alined with the upper outer tube 208. The outer tube 208a encloses the aluminum tube 12 that extends through the reaction tank 11. The opposite end of the threaded jacket 214 is likewise threaded, being engaged by a lower cap member 218 holding an integral flange 220 of the lower outer tube 208a. The lower cap member 218 maintains a water tight joint between tube 12 and the lower outer tube 208a by compression of dual neoprene gaskets 221 and 222 having therebetween a spacer 224. The tube 12 extends through the lower cap member 218 and terminates in a flange 225 seated against a water inlet housing 226 by pressure exerted through a neoprene gasket 228 by an internal annulus 230 in threaded engagement with the water inlet housing 226. Cooling water is introduced to the inlet housing 226 through an inlet 232 either from one of the upper or the lower distribution channels 136—138 as appears hereinafter in connection with the description of Figs. 10 and 11.

Referring to Fig. 7, each of the uranium rods referred to generally by reference numeral 14 comprises a uranium core 234 having a threaded integral extension 236 on each end, only one end being shown, the other being constructed identically. The core 234 is covered over its lateral surface with an aluminum coating 238 which is flanged inwardly over the ends of the core 234 as shown at 240. A bullet-shaped aluminum end section 242 is provided at each end of the coated uranium core 234 and screwed into snug engagement with the flange portion 240 of the coating 238 to provide a water tight fit. The bullet-shaped end cap 242 is made in this shape to reduce resistance to water flow through the tube 12. The cap on each end of the coated core 234 is provided with a central recess 244 communicating with the end thereof through an annular channel 246. A cable 248 enters the recess 244 in the end cap 242 and may be affixed therein by knotting and filling a portion of the recess with molten aluminum, although other means for fastening the cable 248 in the recess or to the end cap 242 may be utilized.

Referring to Fig. 8, the cable 248 attached at its lower end to the uranium rod 14 terminates at its upper end in a loop 250 held by clamps 252, the weight of the rod 14 after placement within the tube 12, Fig. 6 being borne by an apertured tapered grommet 254 which is shown in Fig. 6 as centered and supported by the top cap member 202 in the tube assembly. Each loop 250 has connected thereto a cable 255 extending from a support 257, as best shown in Fig. 2.

Figure 9:
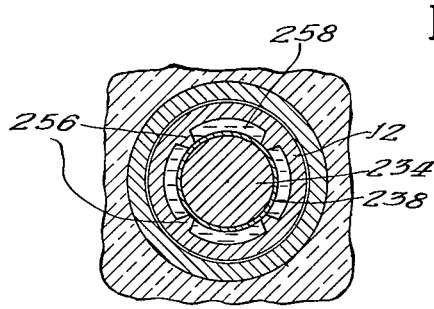
Fig. 9 is an enlarged cross-sectional view of one of the tubes shown in Fig. 6 taken along the line 9—9 thereof.

The tube 12 is so designed as to have a somewhat larger inside diameter than the diameter of the coated uranium rod 14 shown in Fig. 7 to provide a path for the flow of cooling water over the rod surface, specific dimensions being given hereinafter. It is preferred, however, to center the rod 14 in the tube 12 as shown in Fig. 9 by providing integral ribs 256 on the inner periphery of the tube 12. The ribs 256 are effective in increasing the rigidity of tubes 12 throughout their unsupported length within the reaction tank 11 and also provide centering of the rods 14 within the tubes 12, leaving an irregular annulus of water 258 therebetween.

It is preferred, as indicated above, to introduce the cooling water at the lower ends of the aluminum tubes 12, forcing it to flow upwardly under pressure around the uranium rods 14 through the apertured grommets 254 and into the shield tank 18. Since, in operation, the amount of heat that may be withdrawn from the reactor 10 is limited to a great degree by the quantity of water flowing about the coated uranium rods 14, the pressure of water necessary to develop a fast flow may lift the rods 14 vertically. Therefore, in accordance with the invention, there is provided means to retain the uranium rods 14 in their desired position centrally of the reaction tank 11.

Referring again to Fig. 6, each rod 14 may be retained in its desired position by a holddown cable 260 attached to the lower end of the uranium rod 14 similarly to the attachment shown for the upper end in Fig. 7. The lower end of the cable 260 is embedded in a tapered plug 262 forced by water pressure in the water inlet housing 226 against an apertured retainer 264 and a compression gasket 266. A higher pressure is provided on the upper surface of the tapered plug 262 with respect to that exerted on the lower surface by providing a removable closure plug 270 that, when removed, opens the lower portion of the water inlet housing to atmospheric pressure during operation of the system. Consequently, the holding down force upon the cable 260 is proportional to the cooling water pressure tending to lift the rod within the tube 12. By such an arrangement we assure proper hold down of the rods 14 irrespective of the water pressure exerted thereon. Prior to removal of the rod 14, however, the closure 270 is reinserted in bushing 268 to prevent water flow through the aperture left by lifting of the tapered plug 262 from its seat on the gasket 266.

Figure 10:
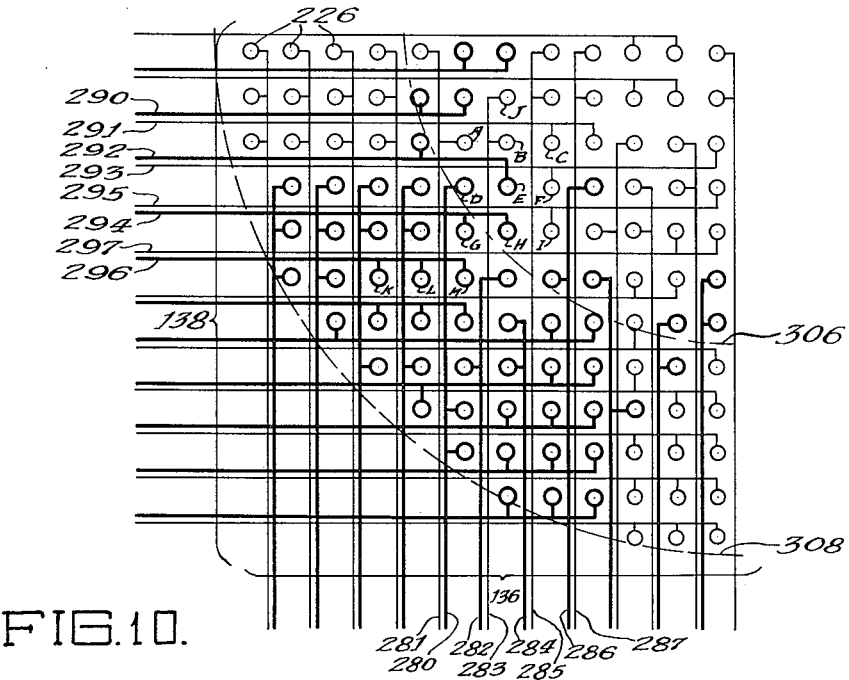
Fig. 10 is a diagrammatic representation of the cooling water distribution system used in the apparatus of Fig. 2.

In Fig. 10 only one quadrant of the reactor 10 and the associated cooling water distribution system is shown, the other quadrants being similar thereto. Referring to Fig. 10, the distribution channels generally designated 136 are shown as heavy and light vertical lines while the distribution channels 138 are shown as heavy and light horizontal lines extending between the tube assemblies shown as circles and representing the water inlet housings 226. An enlarged fragmentary bottom plan view of the distribution system is shown in Fig. 11, nine representative water inlet housings 226 being designated as A, B, C, D, E, F, G, H and I.

Figure 11:
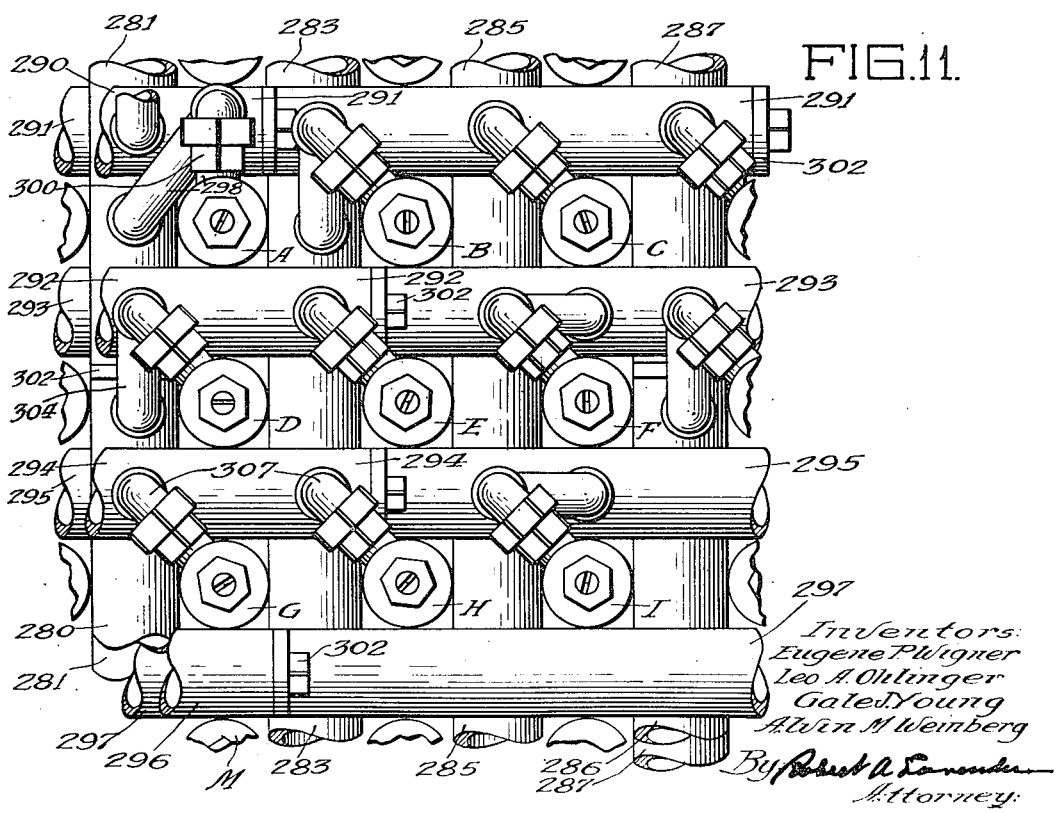
Fig. 11 is a view of a fragmentary portion of the distribution system shown diagrammatically in Fig. 10.

Referring to Figs. 10 and 11, the distribution channels 136 leading to or adjacent the representative inlet housings A to I inclusive, are designated consecutively 280 to 287 inclusive, the even-numbered references designating the heavy line channels 136 lying above the light line odd-numbered referenced channels. For example, channel 280 is shown in Fig. 10 as a heavy line and in Fig. 11 as lying above the channel 281. In a similar manner the distribution channels 138 leading to or adjacent the representative housings A to I inclusive are designated consecutively 290 to 297 inclusive, the even-numbered references designating the heavy line channels 138 lying above the light line odd-numbered referenced channels. As an example of this portion of the distribution system, channel 292 is shown in Fig. 10 as a heavy line and in Fig. 11 as lying above the channel 291.

More particularly, and referring to Fig. 11, the channel 281 extending below the channel 280 connects with the water inlet housing A through a gooseneck inlet line 298 having a union 300 therein for ease of assembly and replacement of the aluminum tube 12 (not shown). The overlying channel 280 terminates at 302 and connects to the housing D through a similar gooseneck line 304. The channel 282 shown in Fig. 10 is not shown in Fig. 11 because it terminates before reaching the representative inlet housings shown in Fig. 11 although the channel 283 underlying channel 282 is shown as feeding the inlet housing B. Likewise channel 284 is not shown, being terminated similarly, the channel 285 passing beyond inlet housings B and C to a housing beyond the representative section. Channels 286 and 287 also feed inlet housings without the representative section shown in Fig. 11. Channels 290 and 291 each feed an inlet housing outside the representative section, channel 291 also feeding inlet housing C. Inlet housings E and F are fed by channels 292 and 293 respectively, while housings G and H are fed by the channel 294, the underlying channel 295 feeding housing I. Channels 296 and 297 feed housings without the representative section described. It should be noted that the housings G and H as well as C and E are fed by upper channels and consequently gooseneck shaped lines need not be used, a right angle line 307 providing the connection between the distribution channels and the inlet housings.

The above-described water distribution system is compact and introduces a minimum of pressure loss in the system so that even when the tubes 12 are spaced in a square pattern at 4 inch center to center distances, the cooling water flow is adequate.

It is a characteristic of the operation of a neutronic reactor, that the neutron density in the reactor is higher at the center of the reactor and decreases progressively toward the periphery thereof. Consequently, during the operation of such a system it is desirable to cool the uranium rods adjacent the center of the reactor to a greater degree than those nearer the outside of the reactor. There is thus shown in Figs. 10 and 11 means whereby a greater quantity of cooling liquid may be supplied to the inner tubes than to the outer tubes of the reactor. For example, the distribution system including the channels designated 136 and 138 is arranged and operated in such a manner that the uranium rods 14 adjacent the center of the reactor 10 are cooled at a greater rate than the rods 14 more remote from the center. For example, in the embodiment of the invention shown in the drawings, we arrange the cooling water distribution channels in such manner that two tubes are connected to a single channel adjacent the center of the reactor while three tubes are connected to a single channel in a section more remote from the center of the reactor.

More particularly, and as an example of this feature of the invention, and referring to Fig. 10, the two tubes designated B and J lying within the circle quadrant 306 are fed by the channel 283, while the three tubes designated K, L and M lying between the quadrants 306 and 308 are fed by the single channel 296. For convenience in design some variation in this arrangement may be allowed although it is preferable to provide over adequate cooling to any one tube. Thus, even though the tube designated G is between the quadrants 306 and 308 only two tubes, namely G and H are fed by the channel 294 inasmuch as the tube H is substantially within the division between the two sections that are cooled to different degrees.

From the foregoing it should not be assumed that there is a sharp dividing line with respect to cooling requirements within the reactor 10. As later described, in connection with uranium removal, the neutron density varies substantially as a cosine curve from the center of the reactor outwardly. In addition the arrangement shown in Fig. 10 is exemplary only, other arrangements being feasible in which the innermost tubes are provided with a greater quantity of cooling water either by greater pressure or greater channel capacity.

Figure 12:
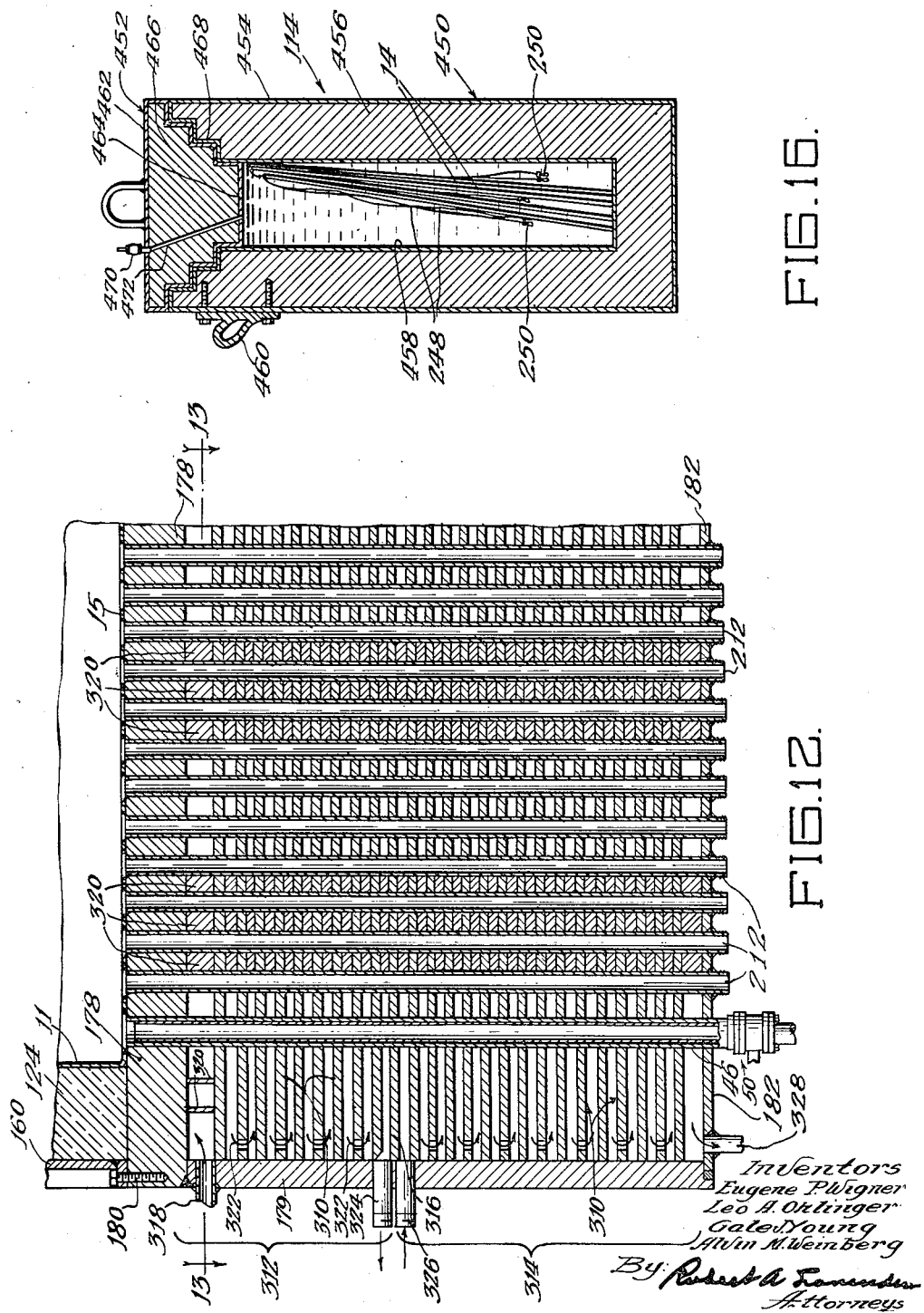
Fig. 12 is a sectional view, partially in elevation, of a portion of one neutron and gamma ray shield used in the apparatus shown in Fig. 2, the view being taken along the line 12—12 of Fig. 13.

The neutron and gamma ray shields 104 and 106 below and above the reactor 10 are constructed of alternate layers of neutron slowing and neutron absorbing material, these materials likewise serving as gamma ray absorbers. The lower and upper shields are substantially identical being of circular plan cross section and consequently we have shown in Fig. 12 an elevation cross sectional view of half of the lower shield 104. The bottom of the reaction tank 11 rests on and is supported by the top plate 178 of the shield 104 which is apertured to pass the outer tubes 208a that extend through the shield. The shields are each five feet in thickness and include 25 one inch thickness steel plates 310 separated from one another approximately one inch in the vertical direction. The shield 104 is divided into a plurality of sections, such as two sections 312 and 314 for more efficient cooling thereof by one of the plates 310 as shown at 316, the upper section 312 of the shield including 9 plates and the lower section 314 including 15 plates, plate 316 being common to both sections. One purpose of dividing the shield unequally is to provide more adequate cooling for the upper section adjacent the reaction tank 11 where the neutron and gamma ray density is relatively high. The shield may, of course, be divided into more than two sections for more efficient use of the cooling medium. As a coolant, we prefer to introduce cool water into the upper section through a series of inlet pipes 318 best shown in Fig. 13. Water introduced through the inlet pipes 318 is circulated across the shield between the top member 178 and the uppermost plate 310 and directed between the said member and plate by guide vanes 320 extending between the nipples 212 that extend through the shield. The guide vanes 320 between the top plate 310 and the top member 178 extend from between inlet pipes 318 to the opposite side of the shield shell 179. Apertures (not shown) are provided in the uppermost plate 310 opposite the inlet pipes 318 communicating with the space below between top plate 310 and the next lower plate 310. A similar aperture 322 is located in the next lower plate underneath the inlet 318. Apertures 322 alternate between ends of the channels between the plates 319 formed by the guide vanes 320 causing the cooling water to flow back and forth over the shield plates, the heated water being removed at outlets 324. The plate 316 is unapertured and forms a circulation barrier between the upper and lower sections of the shield. The lower section of the shield 104 is similarly constructed of plates alternating with water spaces, the channels extending between similar inlets 326 and outlets 328, the outlets 328 piercing the lower plate 182 adjacent and about the periphery thereof. The channels through which the water flows across the circular shield 104 comprise a plurality of irregular chords, the longest of which runs substantially through the center of said shield, the chords having an overall parallel relationship.

The upper shield 106 (Fig. 2) is constructed similarly to shield 104, except that the lower section thereof is more adequately cooled inasmuch as this is the section adjacent the reactor 10. This may be accomplished by providing a greater flow of coolant through this portion of the shield or by unequal division of the shield as shown and described in connection with shield 104.

By dividing the two shields in the manner just described, any radioactivity induced in the cooling water in the shield portion adjacent the reactor 10 is removed with the water discharged through the pipes 324 without contaminating the cooling water in the outer shield portion. Thus the outermost layer of each shield is kept relatively free from radioactivity. Obviously, as indicated above, the shields may be divided into more than two segments.

As indicated above, some radioactivity may be present in the shield tank 18 above the upper composite shield 106. Thus the shield 106 is not a complete barrier for neutrons and gamma rays. Furthermore, any failure such as by corrosion of the aluminum coatings 238 of the uranium rods 14 may allow escape of fission products into the cooling water flowing through the tubes 12 and into the tank 18. It is for this reason that we provide an immiscible liquid 22 over the water 20 in the tank 18. Such a liquid prevents circulation of the water 20 near the upper surface of the tank and absorbs any radiation from the radioactive products that may be suspended or dissolved in the water 20. The liquid 22 being of hydrogenous material has high neutron slowing characteristics as well as relatively high gamma absorption characteristics so that the relatively low emissions from the water 20 are effectively absorbed and prevented from escape from the shield tank 18.

The neutronic reaction, as previously indicated, is dependent upon the emission of fast neutrons during fission of the uranium and it is necessary for these neutrons to be slowed to thermal energy levels for effective utilization in producing new fission and consequent continuation of the neutronic reaction. The moderator of heavy water is used expressly for the purpose of slowing the neutrons so that they may be effectively utilized in producing new fission of the uranium, and consequent emission of further fast neutrons. Fast neutrons emitted from the uranium that is not surrounded by heavy water are not nearly as effective in producing new fission because of the absence of the moderator and consequently the neutronic reaction may be controlled in neutron density by control of the heavy water moderator level. Control of the reaction may therefore be effected by varying the level of the heavy water surrounding the uranium contained within the tubes of the reactor. All possible precautions must be taken to prevent abnormal rise in the moderator level in the reaction tank, inasmuch as the variation in level of the heavy water and consequent variation in neutron density cannot be likened unto a throttle control.

The rate at which the reaction occurs is not dependent upon the volume of the heavy water moderator within the reaction tank but rather upon the neutron density attained after exceeding critical size by admitting heavy water to the reaction tank and before decrease to critical size by removal of some of the heavy water. For example, upon increase of the heavy water volume within the reaction tank beyond critical size the neutron density would continue to increase exponentially with time irrespective of the cooling capabilities of the system. Control is therefore effected by variation of the heavy water volume within the reaction tank above and below a volume corresponding to critical size. Thus the neutron density is a variable, changing between upper and lower limits, and is accomplished by variation of the heavy water level within the reaction tank as later disclosed.

We have shown in Fig. 15 a schematic diagram, circuit A representing the control of heavy water moderator level within the reaction tank, and circuit B safety means whereby the heavy water moderator may be removed rapidly or dumped into the heavy water reservoir previously described in connection with Fig. 1.

Figure 15:
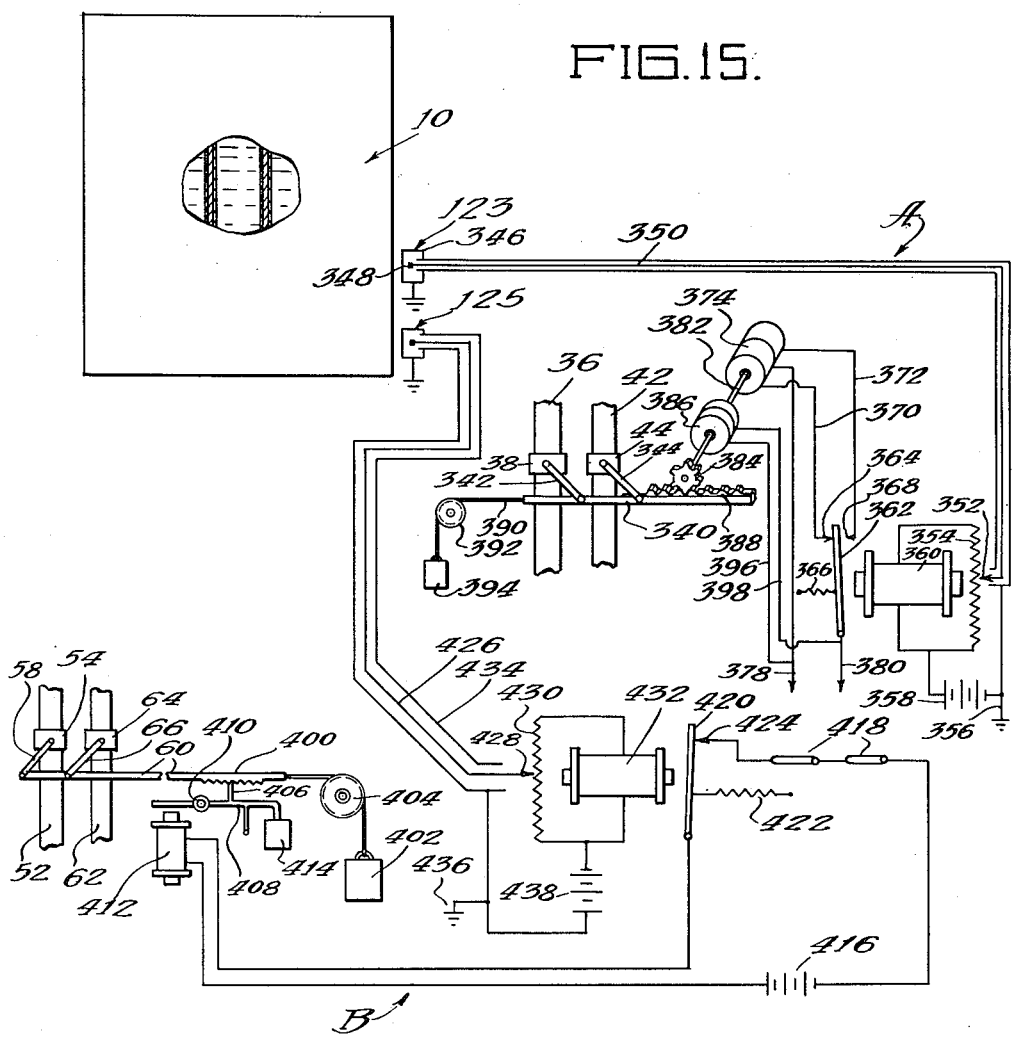
Fig. 15 is a circuit diagram showing two preferred arrangements for control of our neutronic reaction system.

Referring to Figs. 1 and 15, the heavy water is forced into the reaction tank 11 by pressure maintained in the heavy water reservoir 32 through the valve 38 in the line 36, the heavy water being returned to the reaction tank 32 through the line 42 and valve 44 under positive pressure developed by the pump 40. The valves 38 and 44 are designed such that they may be controlled, as by a valve actuating rod 340 connected to the valve 38 through a valve lever 342 and to the valve 44 through a valve lever 344. The valves 38 and 44 are so designed that when one is being opened, the other is being closed. Thus under movement of the actuating rod 340 the heavy water return to the reservoir 32 may be decreased while the supply of heavy water to the reactor is increased, thereby raising the level of heavy water within the reactor. For reverse motion of the actuating rod 340 the return of heavy water to the reservoir is increased whereas the supply is decreased, resulting in a fall of the heavy water level within the reactor.

Such control of heavy water level in the reaction tank 11 is preferably of automatic nature responsive to variation in neutron density within the reactor 10. We have previously referred to the ionization chambers 123 and 125 in connection with Fig. 2, such chambers being particularly adapted for control of the neutronic reaction in accordance with neutron density. The ionization chamber 123 may comprise a sealed metal casing 346 containing approximately 18 liters of boron fluoride at one atmosphere pressure into which projects a central electrode 348. The central electrode is connected through a wire 350 to a sliding contact 352 on a resistor 354. One end of resistor 354 is connected to a grounded shield conduit 356 surrounding the wire 350 through a battery 358 of about 450 volts potential. The other end of resistor 354 is connected through a relay coil 360 and through the coil to the battery 358. The relay coil 360 is arranged to operate an armature 362 normally held in electrical engagement with a contact 364 by a spring 366, the armature being drawn into engagement with a second contact 368 by the magnetic flux developed by the relay coil 360 upon ionization of the boron fluoride in the chamber 123. The contacts 364 and 368 are connected by wire lines 370 and 372 to a reversible motor 374, the motor circuit being completed through an external power source through lines 378 and 380 and to the armature 362. The motor 374 is provided with a shaft 382 connected to a pinion 384 through a magnetic clutch 386, with pinion 384 engaging a rack 388 rigidly affixed to the actuating rod 340 for control of the valves 38 and 44 as previously described. The opposite end of the actuating rod 340 from the rack 388 is provided with a flexible connection 390 passing over a pulley 392 to a weight 394. Magnetic clutch 386 is likewise energized from the power source 376 through lines 396 and 398 so that in the event of failure of the power source the clutch 386 is disengaged allowing the weight 394 to close the valve 38 and open the valve 44.

For low neutron densities within the reactor, the armature 362 will rest against contact 364 causing the motor 374 to rotate the direction being chosen to open the valve 38 and close the valve 44, this being the position shown in Fig. 15. Assuming greater pressure in the reservoir 32 than in the reaction tank 11, the heavy water is forced through the pipe line 36 into the reaction tank 11. As the reaction tank 11 is filled with the heavy water moderator and greater portions of the tubes 12 containing the uranium rods 14 become immersed in the heavy water, the neutron density within the reactor will increase and consequently greater ionization will be produced in the boron fluoride within the ionization chamber 123. The current in the relay coil 360 will therefore increase for a high setting of the contact 352 on the resistor 354 and the armature will tend to be attracted by the relay coil into engagement with the contact 368.

The ionization chamber 123 may be calibrated previously in accordance with the expected neutron density to which it may be subjected by reason of its proximity to the reactor 10 in the reflector 124, and the tension of spring 366 is so adjusted that the tension is overcome at a time when the neutron density within the reactor has reached a desired maximum value. For this neutron density, the armature 362 is drawn into engagement with the contact 368 and the motor 374 is reversed thereby moving the rack 382 in the closing direction for the valve 38 and in the opening direction for the valve 44. Depending upon the response of this control circuit with respect to the rapidity of rise or fall of neutron density within the reactor, in response to variation in heavy water level, the valves 38 and 44 will be in a semi-opened position balancing the flow of water to and from the reaction tank 11. When this point is reached during operation, an equilibrium between the maximum and minimum desired neutron density may be obtained by mutual adjustment of the tension of spring 366 and of sliding contact 352, so that the motor is alternately rotated in opposite directions and the valves 38 and 44 are alternately adjusted to provide a net flow of heavy water to or from the reaction tank 11. Thereafter, the heavy water level will hunt between a maximum and minimum level corresponding to a size of the reactor slightly above and slightly below critical size. Any well-known anti-hunting device may be used to limit this hunting action of the valves 38 and 44.

In the event of failure of the circuit shown in Fig. 15 at A, we prefer to provide emergency dumping means whereby the heavy water moderator may be removed rapidly from the reactor. Referring to Fig. 15, circuit B, in conjunction with the schematic diagram shown in Fig. 1, during the operation of the reactor 10, the valve 54 is maintained in an open position and the valve 64 in a closed position by valve levers 58 and 66, respectively, connected to the actuating rod 60. For this positioning of the valves 54 and 64, helium pressure is maintained within the heavy water reservoir 32 sufficient to maintain the valves 50 in a closed position. However, in an emergency the valve 54 is closed in unison with the opening of valve 64, to reduce the pressure within the reservoir 32 to atmospheric pressure allowing the valve gates 196 (Fig. 5) to be withdrawn from the pipe lines 46, thereby permitting the heavy water to be forced through the pipe lines 46 into the heavy water blowdown header 48 and thence into the heavy water reservoir 32. A convenient mechanism for performing this operation is likewise shown in Fig. 15 wherein the actuating rod 60 is attached to a rack 400 connected to a raised weight 402 over pulley 404 normally urging the valve 58 into a closed position and the valve 64 into an open position. Movement of the rack 400 is normally prevented by a latch 406 attached to a weighted arm 408 pivoted at 410.

The latch 406 is maintained in engagement with the rack 400 by magnetic attraction developed by a magnetic coil 412 notwithstanding a weight 414 on the opposite end of the arm from the coil 412. The coil 412 is energized from a battery 416 in series with emergency break switches 418 and a movable armature 420 maintained by a spring 422 against contact 424 thereby completing the circuit energizing the magnetic coil 412. As previously indicated, a second ionization chamber 125 exposed to the neutrons escaping from the reactor and preferably located in the neutron reflector 124 is connected by wire line 426 to a sliding contact 428 on a potentiometer 430. The potentiometer 430 is connected across a magnetic relay coil 432 mounted in such a position as to break the circuit between the contact 424 and armature 420 when energized by current flowing in the ionization chamber 125. The wire line 426 is enclosed in a shielding conduit 434 and connected to ground 436 and to one side of the potentiometer 430 through a battery 438 to complete the ionization chamber circuit.

The contact 428 on the potentiometer 430 is adjusted so as to provide sufficient magnetic flux to overcome the tension of spring 422 by attraction of the armature 420 to break the electrical circuit between the contact 424 and armature 420 for a neutron density somewhat higher, such as 5 percent, than the maximum density for which the sliding contact 352 on resistor 354 is set for control of heavy water volume in the reactor. For this adjustmen of circuit B an abnormal increase in neutron density greater than 5 percent above the maximum for which the heavy water level control circuit A is set, causes the magnetic field developed by the coil 412 to collapse allowing the weight 414 to be released withdrawing the latch 406 from the rack 400. The weight 402 will then pull the rack 400 and valve actuating rod 60 to such a position that the valve 54 is closed and the valve 64 is opened. In this manner, the flow of helium from the reservoir 56 (Fig. 1) through the line 52 to the reservoir 32 is interrupted and the pressure within the reservoir 32 is reduced to atmospheric pressure by release of the helium through the valve 64 and line 62. Such reduction in pressure causes opening of the valves 50 in the lines 46 and dumping of the heavy water into the header 48 and thence into the reservoir 32. Such rapid removal of the heavy water moderator will prevent the neutron density from rising above a maximum safe level provided the reproduction ratio of the reactor does not exceed unity by a substantial amount. As appears hereinafter, if the reproduction ratio is too high there may be insufficient time for the heavy water to be drained from the reaction tank and an excessive neutron density may occur. It is therefore desirable to provide a total quantity of uranium and a distribution of the tubes containing the uranium such that an excessive reproduction ratio will not result in the event that excessive volumes of heavy water moderator are introduced to the reactor.

Other control means may be utilized to assure safety during the operation of the neutronic reactor such as recording thermometers in the cooling water exit ends of the uranium containing tubes 12, remote recording flow meters in the cooling water distribution channels, as well as other controls commonly dictated by sound engineering practice. The use of such controls is well-known and need not be repeated here, although it is imperative that the neutronic reaction should not be allowed to rise exponentially in neutron density to a value exceeding the heat dissipating capabilities of the water flowing through the tubes 12.

An excessive neutron density within the reactor may cause vaporization of the cooling water within the tubes 12, thereby reducing the effective quantity of water in these tubes. Such reduction of the volume of cooling water within the reactor would cause an immediate increase in the reproduction ratio of the system and, unless the heavy water moderator level were reduced rapidly, would lead to a further increase in neutron density. This is due to the fact that the cooling water has finite neutron absorption characteristics and, should the volume of cooling water be decreased within the reactor, the neutron absorption is likewise decreased allowing the otherwise absorbed neutrons to enter into the neutronic reaction and produce a more rapid exponential rise in the neutron density. Consequently, every precaution should be used to prevent any such dangerous condition from arising.

The system can be operated for a period of thirty or more days at a relatively high power output, as for example, 50,000 kilowatts with the temperature of the system in a state of equilibrium. If it is desired to remove some or all of the uranium rods in the reactor following the operation of the system for this period of time, the neutron reaction in the system must first be shut down by discharging the heavy water from the reactor into the reservoir 32. The operation of the cooling system is continued, however. Assuming that the system has been operating continuously over this period of time, the decline of heat generated in the active portion of the system immediately following the discontinuance of the chain reaction is approximately 85 percent of the heat being generated while the system was in operation. In other words, immediately after the reproduction ratio of the system is reduced below unity by removal of the heavy water, the heat generation rate from radioactivity and delayed neutron emission assumes a value approximately equal to 15 percent of the heat generation rate existing prior to the reduction in the reproduction ratio. Approximately one second after the reproduction ratio is reduced to a value below unity, the heat generation rate has been reduced to approximately 10 percent of the original value. One minute after the original shutdown of the system, the heat generation rate has been reduced to approximately 4.2 percent of the original rate, and one hour following the original shutdown the heat generation rate has been reduced to approximately 1.8 percent of the original rate. This remaining heating is from radioactivity alone.

Directly following the shutdown of the system and for a period of approximately 30 minutes thereafter, there are fissions continuing in the active portion of the reactor due to the release of delayed neutrons. Some of the heat generated during this 30 minute period following the shutting down of the system is due to these delayed neutrons. The remainder of the heat being generated during this period is due to the radioactive decay of the fission products produced during the operation of the system. The delayed neutrons disappear within approximately 30 minutes following the shutdown of the system so that the heat generated after this 30 minute period is caused only by the decay of the radioactive fission products.

It is thus seen that the required amount of cooling after the operation of the system has been shutdown is much less than that needed before shutdown, so that it is possible immediately following the discharge of the heavy water from the reactor tank 11 to reduce the rate of flow of light water through the cooling tubes 12 by a substantial amount. Thus it is possible immediately following the shutting down of the system to decrease the rate of flow of the cooling water through the tubes 12 to a rate approximately 25 percent, more or less, of that originally required during normal operation.

Following the shutdown of the system the uranium rods 14 may be removed from the tubes 12 for recovery of the elements $93^{239}$ and $94^{239}$, as well as the formed radioactive fission products, by lifting the cables 255 (Fig. 2) thereby raising the rods together with the cables 248 and 260 out of the reactor into the shield liquid 19 followed by transfer through the liquid to the coffin 114. However, during operation of the system the formation of these elements and products is not uniform throughout the reactor. Thus a neutron density variation occurs, across the reactor 10; that is, the neutron concentration at the periphery is relatively small and increases to a maximum value at the center. Consequently, since the rate of production of new elements and fission products is dependent upon the neutron density the distribution of these elements and products will be in the form of three-dimensional shells of equal concentration of the elements and products. In a reactor built in the form of a sphere, these shells would be in the shape of concentric spheres of different diameters, while one built in the shape of a cylinder, as shown in the drawings, would have similar zones of equal concentration but of different shapes.

This variation in concentration indicates the desirability of a systematic schedule depending upon the time of operation and the location of the uranium for removing and discharging uranium metal that has been subjected to neutron bombardment. In the case of a new system incorporating natural uranium rods, the operation would normally continue until the metal in the center portion of the reactor reaches a desired content of element $94^{239}$, at which time this metal should be removed and replaced with fresh metal. The next removal then would be from the section next adjacent to the center section of the reactor where the desired content of element $94^{239}$ is reached after further operation. The process would then proceed with the removal of metal at various times until the metal recharged at the center of the reactor has reaches the desired content of element $94^{239}$. This would then be replaced and the process of progressing toward the periphery continued, with periodic return to more central areas. A removal schedule can be developed by calculation, and checked by actual experience after the system has been placed in operation.

The power output of a system, stated in terms of heat energy, refers to the total heat production for the entire active portion of the reactor. Since the heat results from fissions in the uranium, it is evident that this heat is not formed uniformly throughout the reactor but that it must vary across the active portion of the reactor with the local rate at which fissions occur and element $94^{239}$ is formed. Consequently, the relative values for the production of $94^{239}$ apply also to heat evolution; that is, the heat generated increases from a minimum at the outer surface of the reactor to a maximum at the center.

Since the total weight of the radioactive fission products is proportional to that of the $94^{239}$ at the time of fission, it might be assumed that the amount of these radioactive fission elements and of $94^{239}$ present in metal removed from the reactor are also of the same proportion. This is not true, however, as the fission elements when produced are highly radioactive and immediately start to decay, some with short half-lives and others with longer half-lives until, through loss of energy, these unstable fission elements arrive at a stable element or isotope, and no longer change. The $94^{239}$ on the other hand, is a relatively stable element when formed, having a radioactive half-life of about $10^4$ years.

At the start of the reaction in new metal, the radioactive fission elements and the $94^{239}$ both increase in amounts. After a certain period of operation during which time the material is subjected to intense neutron bombardment, the radioactive fission elements can reach a state of equilibrium, and from that time on, the amounts of these elements remain constant as the shorter-lived fission elements are reaching a stable condition at the same rate new ones are being produced. The amounts of stable end products of fission, however, continue to increase with the increase in element $94^{239}$. Consequently, the rate of formation of the end products, that is dependent upon the location of any particular metal in the reactor and the total neutron density at which the system operates, controls the maximum radioactivity of the fission products regardless of the length of time the system operates. The quantity of element $94^{239}$ on the other hand, and the final and stable end products of fission, continue to increase as the operation of the system continues. The amounts of the latter present are controlled only by the location of the metal in the reactor and the time and power of operation. The original highly radioactive fission products may, therefore, vary from a substantial percentage of the weight of element $94^{239}$ present in the metal at the center of the reactor after a short period of operation, to a very small percentage in the uranium metal from a position near the periphery of the reactor after an extended operating period at a given power.

It is not to be assumed, however, that the fact that equilibrium can be obtained between the original highly radioactive fission products and the stable fission end products, that all radioactivity will cease when the original fission products have been permitted to decay for a time equal to the equilibrium period. For example, many of the original fission products have long half-lives which, together with their successive radioactive disintegration daughter products existing long after the fission products having the shorter half-lives have decayed, renders the uranium still radioactive, especially after prolonged bombardment at high neutron densities. The energy released by such radioactive decay of the fission products is exhibited by heating of the uranium and this heating is quite rapid and spontaneous due to the intense radioactivity of the shorter-lived fission products. The amount of heat given off as a result of the spontaneous heating will depend particularly on three factors:

(1) The concentration of element $94^{239}$ and fission products in the metal; (2) the period of time of continuous operation required to reach this concentration; and (3) the elapsed time since the reactor was shut down and the metal was removed.

The metal from the center of the reactor in a system operating at a high power output, for example, at a $94^{239}$ concentration of 1 to 2000, if not cooled, might increase in temperature at the rate of about 2000° C. per hour one day after the neutron activity of the system has been shut down. After 30 days shutdown after operating at an output of 50,000 kilowatts, the average temperature rise is approximately 126° C. per hour. Uranium metal of the type used in neutronic reacting systems melts at about 1100° C.

Under these conditions, uranium metal bombarded with neutrons for an extended period of time at high rates of power output may be safely removed from the reactor under the following procedures:

A. The neutron activity of the system is shutdown, and the uranium metal is kept in the reactor and continuously cooled until the radioactivity decays to a point where the metal can be removed without melting in ambient air. This procedure may require that the metal remain in the reactor for a period of from 30 to 50 days after the neutron bombardment has ceased;

B. The neutron activity of the system is shutdown and the metal is kept in the reactor with the cooling system in operation for only a few days to permit the most violent radioactivity to subside and then the metal is removed from the reactor for cooling discontinued during the removal, except for cooling by the atmosphere or by air or water spray. The metal is then promptly placed under more efficient cooling conditions before the temperature of the metal has had sufficient time to reach the melting point of uranium; or C. The neutron activity of the system is shutdown and the uranium metal is removed under continuous and effective cooling such as is disclosed in the preferred embodiment of the invention, wherein the uranium is discharged directly into the tank 18 containing the water 20.

It is important, of course, from a point of view of biological safety, that adequate shielding be provided to absorb the strong gamma radiations from the fission elements present in the active uranium while being removed from the reactor. The neutron activity in the system ceases within 30 minutes after shutdown, during which period delayed neutrons may be emitted from recently formed fission fragments. The quantity of water 20 and light hydrocarbon 22 in the shield tank 18 is effective in slowing and absorbing these neutrons emitted after shutdown of the neutronic reaction and is likewise effective in reducing the gamma radiation to levels that are biologically safe for short periods of time. It is desirable, however, to delay removal of the uranium from the reactor for a period of at least 30 minutes during which period the emission of neutrons from the fission fragments ceases and the initial gamma ray intensity becomes reduced by substantial decay of the short-lived fission products.

The chamber or coffin 114 is positioned, as previously described in connection with Fig. 2, to receive the uranium rods 14 after removal from the tubes 12 in the reactor 10. Referring to Fig. 16, the coffin 114 is preferably of cylindrical shape and comprises a bottom portion 450 and a lid 452. The bottom portion 450 includes a steel shell 454 lined with lead 456 to a substantial thickness with a liner 458 of steel forming an inner wall defining the space within the bottom portion adapted to receive the uranium rods 14 following their removal from the reactor 10. The bottom portion 450 is provided with one or more ears 460, or a bail, or the like fastened to the upper end thereof so that the coffin may be lowered into the water 20 within the tank 18 by block and tackle 115 (Fig. 2) and later raised following placement of the uranium rods 14 therein.

The coffin lid 452 likewise comprises a steel shell 462 and liner 464 enclosing a lead body 466, the periphery of the lid being stepped inwardly as shown at 468. The bottom portion 450 is similarly stepped to provide a mating seat for the lid 452 so as to provide a tortuous path for any radiations of radioactive origin passing from the inside of the closed coffin toward the outside. Such radiations are absorbed in the lead and are thus prevented from escaping.

The coffin lid 452 is provided with a steam safety valve 470 communicating through a channel 472 with the interior of the coffin, inasmuch as the heat developed by radioactivity of the rods after placement on the coffin is transferred to the water inherently filling the coffin. Such heating causes the water to boil, the excess heat being removed in the form of steam. This is particularly true in a short interval of time following raising of the coffin out of the tank 18.

A few uranium rods 14 are shown loaded within the coffin 114, the loading being effected by lifting each uranium rod 14 from the reactor 10 by raising the corresponding cable 255 attached to the cable 248 and thence to the rod, swinging the rod sideways and lowering the cable 248 and rod into the coffin while the coffin is supported on the I-beams 116 (Fig. 2). The cable 255 may be detached from the grommet 250 by use of a slip hook (not shown). The entire cable 248 may be dropped into the coffin or may be disengaged from the uranium rod although the hold-down cable 260 and tapered plug 262 previously referred to in connection with Fig. 6 are preferably bunched in the bottom of the coffin.

At the time the active uranium rods 14 are placed in the coffin 114, they are disopsed under water and are thus cooled and shielded. After the coffin 114 is filled, it is raised to the top of the shield water and removed to an aging pit, not shown. During removal to the aging pit the heat is dissipated by evaporation of the water in the coffin escaping therefrom as steam through the safety valve 470.

The entire coffin and contents are placed under water in the aging pit where the radioactive decay continues. The actual separation of elements $93^{239}$ and $94^{239}$ and radioactive fission products from the uranium is not started until the radioactivity of the fission products has decayed to limits wherein the material can be handled with the exercise of practical safety precautions. Such separation of the newly formed elements and fission products forms no part of our present invention and, for this reason, a detailed description of the separation and recovery processes is not included herein.

However, following the recovery processes, the elements and products are extremely useful. The radioactive fission products are valuable for use as radiation sources, many having high energy gamma radiations with long half-lives, sufficient for radiography of even heavy metal castings. In addition, some of the fission products are useful as radioactive tracers in biological and physiological research, and are in demand by the medical profession.

Element $94^{239}$ is very useful, as it is fissionable by slow neutrons in the same manner as the uranium isotope $92^{235}$ contained in natural uranium. The separation of $92^{235}$ from $92^{238}$ in natural uranium is extremely difficult since both are isotopes of the same element. Element $94^{239}$, on the other hand, is a different element from uranium, having different chemical properties than uranium and therefore can be separated from the uranium without difficulty. After separation, element $94^{239}$ can be added to natural uranium to supplement the $92^{235}$ content, thus increasing the amount of fissionable material in the uranium. This enriched uranium can then be used in neutronic reacting systems making it possible to provide more uniform neutron absorbing and cooling facilities, for example, than could be used in a system of simialr geometry employing only natural uranium. Thus, an enriched system may provide a greater power output than would be possible in a natural uranium system of the same geometry.

As indicated above, any increase in the overall volume of the reactor above critical size, for which condition the reproduction ratio is unity, will result in an exponential rise in neutron density with time. The delay or time factor is due to the fact that not all of the fast neutrons originating through the fission of the uranium nuclei are emitted simultaneously. About 1 percent of the fast neutrons are delayed neutrons. These delayed fast neutrons appear from .01 second to several minutes after the fission has occurred. Half of these delayed neutrons are emitted within 6 seconds and 0.9 within 45 seconds. The mean time of the delayed neutrons is about 5 seconds. The cycle of neutron emission by fission, slowing of the emitted neutrons to thermal energy, and capture by the uranium is completed by 99 percent of the neutrons in about 0.0015 seconds but if the system is near the balanced condition, that is, where the reproduction ratio exceeds unity only by a small amount, the extra 1 percent may make all the difference between an increase or a decrease in the activity. The fact that approximately 1 neutron for every 100 fast neutrons originating in fission is held back as it were, imparts a slowness of response to the system that would not be present if the 100 neutrons were all emitted instantaneously.

For cases in which the reproduction ratio (R differs from unity by less than 1 percent, the ratio of rise is given by:

$$n = n_o e^{wt}$$

where $$w = \frac{R-1}{\alpha-(R-1)} \cdot \frac{1}{T}$$

In this formula $\alpha$ is the fraction of the neutrons that are delayed, ($\alpha = .01$) and T is the mean lifetime of the delayed neutrons=5 seconds.

As an example, suppose as a result of increasing the critical size by increasing the volume of heavy water moderator effective in slowing the neutrons to thermal energy, R becomes 1.001. Then $$w = \frac{.001}{.01-.001} \cdot \frac{1}{5} = \frac{1}{45}$$

that is, $n/n_o = 2.72$ in 45 seconds. Thus doubling occurs about every 30 seconds and continues indefinitely.

If R were made exactly 1.01, a more detailed theory shows that the neutron density would be tripled each second. However, if the reproduction ratio R is suddenly increased several percent, so that the one percent delayed neutrons are unimportant compared with R—1, the neutron density increases at a much more rapid rate as given approximately by $R^{t/e}$ where $e$ is .0015 seconds, the normal time to complete a cycle. Thus if R were to be made 1.04, the neutron density would increase in 1.5 seconds by a factor of approximately $10^{17}$ over its original level. However, if R were 1.02 or 1.03, the factor by which the neutron density would be multiplied each second would be 1100 and 700,000, respectively. It is thus apparent that too high a reproduction ratio in a practical system leads to the necessity of providing safety measures which are positive in action and which positively limit all danger of exceeding a permissible maximum neutron density. An exceedingly dangerous condition could exist, if, by accident, the volume of the heavy water moderator were suddenly increased so that further immersion of the uranium rods within the reactor caused an effective reproduction ratio approaching the above-mentioned higher values, as the time required for lowering the level of the heavy water moderator might be too long to prevent excessive heating of the cooling water and vaporization thereof, with consequent further increase in reproduction ratio and possible destruction of the system. Inasmuch as the same eventual neutron density can be obtained with a reproduction ratio only slightly over unity, as with a higher ratio, only at a lower rate, the lower reproduction ratios are preferred in practice in the interest of safety.

It is, however, necessary in the design of a neutronic reaction system in accordance with our invention, to provide a reactor which has a reproduction ratio greater than unity to allow initiation of the neutronic process. Consequently, the quantities of uranium, heavy water and the disposition of the uranium in the heavy water are so chosen that a neutronic reaction may be initiated notwithstanding neutron loss in the impurities, not only in the uranium and heavy water, but also in other material within the reactor, such as the tubes in which the uranium rods are supported, the cooling water and in the aluminum coatings on the uranium rods. However, inasmuch as the heavy water has low neutron capture characteristics, considerable latitude in the design of the reactor may be allowed. This is particularly true in the type of reactor herein disclosed inasmuch as we utilize a minimum of neutron absorbing members within the reactor. Thus it is unnecessary to provide massive support members to maintain the tubes containing the uranium in their proper position, inasmuch as they are supported vertically in the reaction tank. Consequently, the entire reaction tank may be supported from outside the confines thereof, thereby eliminating the need for such massive support members.

While various volume ratios of uranium to heavy water may be used and the size of the reaction tank may be varied over wide limits and still provide a structure having a reproduction ratio greater than unity, we give herewith a series of dimensions and weights for the principle critical elements in the design of a neutronic reaction system wherein natural uranium containing the isotope $U^{235}$ in a ratio of $1/139$ is used and the uranium rods are spaced one from another in a square lattice arrangement:

| | |
|---|---|
| Number of uranium rods 14 | 460 |
| Length of uranium rods 14 _____feet__ | 7 |
| Diameter of uranium rods 14 _____cm__ | 2 |
| Weight of uranium in rods 14 _____tons__ | 6 |
| Spacing center to center of rods 14 ____inches__ | 4 |
| Aluminum coating 238 thickness _____mm__ | 0.5 |
| Aluminum tube 12 wall thickness _____mm__ | 3 |
| Cooling water annulus 258 _____mm__ | 2.2 |
| Reaction tank 11 diameter _____feet__ | 8 |
| Reaction tank 11 height _____do____ | 9 |
| Approximate heavy water weight _____tons__ | 10 |
| Graphite reflector 124 thickness _____inches__ | 18 |
| Graphite approximate weight _____tons__ | 80 |
| Shield 104 and 106 thickness (each) ____feet__ | 5 |
| Cooling water requirements _____g. p. m__ | 13000 |

In addition to the usual industrial hazards during the operation of the system, operating personnel must be protected from injury by gama rays and neutrons generated from the reaction tank as well as from radiations from the uranium following removal in the coffins previously described, from beta rays, and from radioactive poising due to inhalation of radioactive gases. The major portion of the radiation emitted from the reactor is intercepted by the shields above and below the reactor, and by the water and light hydrocarbon above the reactor which are very effective in slowing and capturing neutrons that may escape through the upper shield.

While we have shown our reactor as being located below ground level, it is obvious that the reactor may be positioned wholly above ground by providing a considerable quantity of water surrounding the reactor and retained within concrete walls. The minimum distance from the reaction tank to such concrete walls is preferably 8 feet and the thickness of such concrete walls is preferably no less than 10 feet. Inasmuch as concrete contains water of crystallization and may contain water retaining materials and is relatively dense, it serves as an effective shield for neutrons as well as gamma rays. Such shielding should be used to reduce the radiation at the surface of the shields to less than that equivalent to a personnel exposure of 0.10 roentgen per 8 hour day. If unpurified water is used as a cooling medium flowing upwardly through the uranium containing tubes within the reactor and into the water reservoir above the reactor, the impurities of this water under neutron excitation within the reactor may become radioactive. In addition, should defects occur in the aluminum coatings covering the uranium rods, radioactive fission products may escape into the cooling water. It is therefore desirable to use a once-through circulating system wherein the cooling water is passed through the reactor and discarded following discharge from the shield tank above the reactor although the use of an immiscible liquid such as previously described floating above the water in the shield tank above the reactor is effective in preventing radioactive water approaching the surface resulting in possible exposure of operating personnel to high radioactivities. Such precautions will reduce the radiation of the structure to 0.10 roentgen per 8 hour day per person at the point of closest approach, this exposure being the maximum safe radiation permissible to which an individual may be subjected over the whole body.

While the theory of the neutronic mechanism in uranium set forth herein is based on the best presently known experimental evidence the present invention is not bound thereby as additional experimental data later discovered may modify the theory herein disclosed. Any such modification of theory, however, will in no way effect the results to be obtained in the practice of the present invention as herein described and claimed.

What is claimed is:

1. A neutronic reactor comprising a reaction tank, a plurality of vertically disposed tubes within said tank, elongated bodies containing material fissionable by neutrons of thermal energy disposed within the tubes, a body of heavy water at least partially filling the tank, the elongated bodies within the tubes being spaced therefrom to provide passages, and means to flow a liquid coolant upwardly through the passages in heat exchange relationship with the bodies and the tubes.

2. A neutronic reactor comprising the elements of claim 1 wherein the liquid coolant flowing upwardly through the passages consists of light water.

3. The neutronic reactor specified in claim 1 and further comprising a body of liquid coolant positioned above the tank so as to submerge the upper ends of the tubes and extending laterally beyond one side of the tank, whereby the elongated bodies after being used up in the tubes may be withdrawn therefrom and stored in the portion of the body of liquid coolant at the one side of the tank.

4. A neutron reaction system comprising a reaction tank, tubes extending vertically through said tank, a heavy water moderator in said tank surrounding said tubes, a plurality of uranium rods supported within said tubes from above said tank, said rods being of smaller cross-sectional area than the internal cross-sectional area of said tubes, a hold-down member attached to each of said rods, means to flow cooling water into the lower ends of said tubes, and means to restrain said hold-down members when said rods are subjected to an upward flow of water through said tubes.

5. A neutronic reaction system comprising a reaction tank, a heavy water moderator in said tank, a plurality of tubes vertically extending through said tank, a uranium rod in each of said tubes of a size to leave a coolant passage in each, means to maintain the rod in each tube connected to the opposite ends thereof, means to admit a cooling liquid to said tubes adjacent the lower ends thereof, and means to adjust the amount of liquid flowing through the tubes adjacent the periphery of said tank in an amount less than the amount flowing through the tubes nearer the center of said tank.

6. A neutronic reactor comprising, in combination, a tank, a plurality of vertically disposed tubes extending through the tank and terminating with open ends above the tank, a body of water submerging the open ends of the tubes and extending thereabove, a heavy water moderator in the tank surrounding the tubes, elongated uranium rods in said tubes, means to flow water through the tubes in heat exchange relationship with said rods and discharging into said body of water, and means for withdrawing said rods out the open ends of the tubes into the body of water including a flexible member attached to each of said rods and to a support above the tank.

References Cited in the file of this patent

FOREIGN PATENTS

| | | |
|---|---|---|
| 861,390 | France | Oct. 28, 1940 |
| 233,011 | Switzerland | Oct. 2, 1944 |

OTHER REFERENCES

Smyth: "Atomic Energy for Military Purposes," pp. 75, 103, 104, August 1945. Copy may be purchased from Supt. of Documents, Washington 25, D. C.

Kelly et al.: Phy. Rev. 73, 1145–9 (1948). (Copy in Patent Office Library.)